(12) United States Patent
Takayama et al.

(10) Patent No.: US 7,224,939 B2
(45) Date of Patent: May 29, 2007

(54) AUDIO BROADCAST RECEIVING APPARATUS AND METHOD

(75) Inventors: Kazuo Takayama, Kobe (JP); Shuji Sugahara, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 352 days.

(21) Appl. No.: 10/992,903

(22) Filed: Nov. 19, 2004

(65) Prior Publication Data

US 2005/0113049 A1 May 26, 2005

(30) Foreign Application Priority Data

Nov. 21, 2003 (JP) ............................. 2003-392426

(51) Int. Cl.
*H04B 7/00* (2006.01)
*H04B 1/68* (2006.01)

(52) U.S. Cl. ........................... 455/45; 455/3.01; 455/47

(58) Field of Classification Search ............... 455/3.01, 455/3.02, 3.06, 45, 47, 63.1, 67.13, 109, 455/179.1, 185.1, 132, 204; 375/270, 301
See application file for complete search history.

(56) References Cited

U.S. PATENT DOCUMENTS

| | | | | |
|---|---|---|---|---|
| 6,005,894 | A * | 12/1999 | Kumar | 375/270 |
| 6,178,317 | B1 * | 1/2001 | Kroeger et al. | 455/296 |
| 6,351,500 | B2 * | 2/2002 | Kumar | 375/270 |
| 6,466,776 | B1 * | 10/2002 | Okanobu | 455/343.2 |
| 6,901,242 | B2 * | 5/2005 | Kroeger et al. | 455/45 |
| 6,980,769 | B2 * | 12/2005 | Toporski | 455/3.01 |
| 2006/0019601 | A1 * | 1/2006 | Kroeger et al. | 455/3.06 |

FOREIGN PATENT DOCUMENTS

| | | |
|---|---|---|
| JP | 05-018135 | 1/1993 |
| JP | 05-018135 | 3/1993 |
| JP | 05-199134 | 8/1993 |
| JP | 07-193518 | 7/1995 |

\* cited by examiner

*Primary Examiner*—Sonny Trinh
(74) *Attorney, Agent, or Firm*—David N. Fogg; Fogg & Powers LLC

(57) ABSTRACT

An audio broadcast receiving apparatus and an audio broadcast receiving method implemented by the audio broadcast receiving apparatus are disclosed. A tuner simultaneously receives a radio wave in a specific frequency band of the analog audio broadcast and a radio wave of the digital audio broadcast transmitted in parallel with the analog audio broadcast in the specific frequency band. A demodulator retrieves the intended audio information by demodulating the signal received by the tuner. An analog receiving signal bandpass filter selectively passes the receiving signal corresponding to the analog audio broadcast radio wave. An analog receiving signal amplifier outputs an output signal representing an amplified receiving signal that has passed the analog receiving signal bandpass filter to the demodulator, and the gain of the amplifier is controlled in accordance with the level of the same output signal. A digital receiving signal bandpass filter selectively passes the receiving signal corresponding to the digital audio broadcast radio wave. A digital receiving signal amplifier amplifies the receiving signal that has passed through the digital receiving signal bandpass filter with a gain controlled in accordance with the level of the same output signal and outputs the amplified signal to the demodulator.

10 Claims, 12 Drawing Sheets

Fig. 3

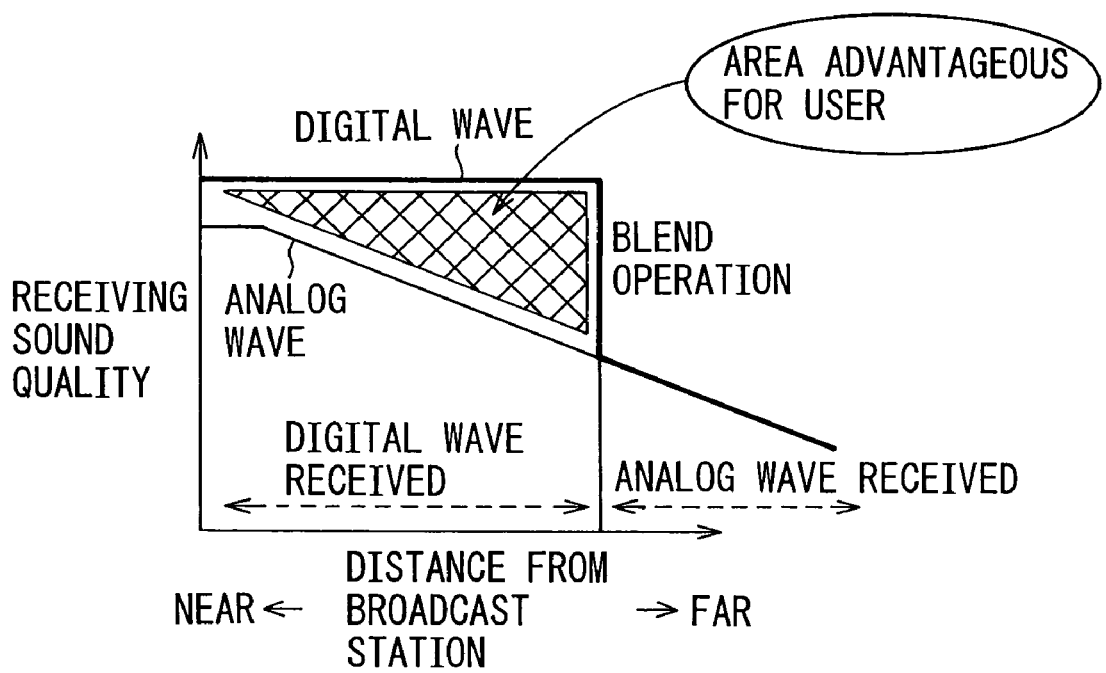

AUDIO SIGNAL PROCESSING (BLENDING)
MIDDLE ELECTRIC FIELD OR STRONGER:DIGITAL AUDIO SIGNAL
WEAK ELECTRIC FIELD OR WEAKER:ANALOG AUDIO SIGNAL

RECEIVING CHARACTERISTIC
· DIGITIZATION IMPROVES THE SOUND QUALITY OF MIDDLE
  ELECTRIC FIELD OR STRONGER
· IN WEAK ELECTRIC FIELD, MODE IS SWITCHED TO ANALOG SOUND,
  AND THEREFORE, THE SERVICE AREA REMAINS UNCHANGED FROM
  THE CONVENTIONAL FM/AM ANALOG AUDIO BROADCAST

Fig.4
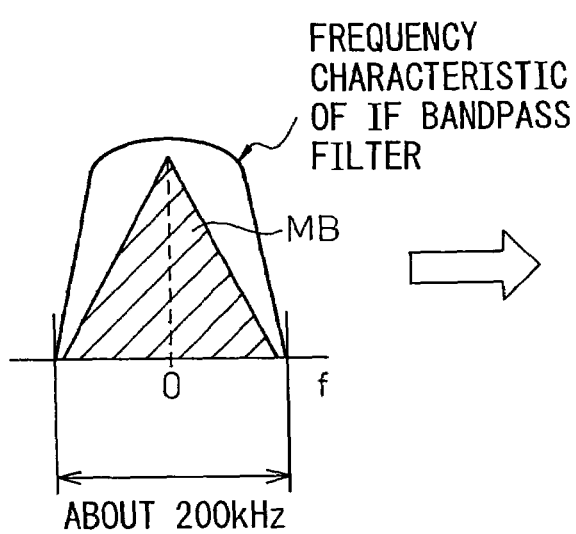
(ONLY ANALOG WAVE IS PASSED)
(a)
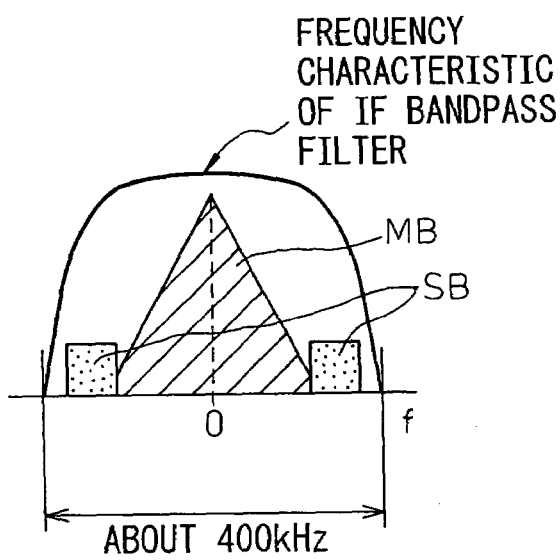
(ANALOG AND DIGITAL WAVES ARE PASSED)
(b)

Fig. 6
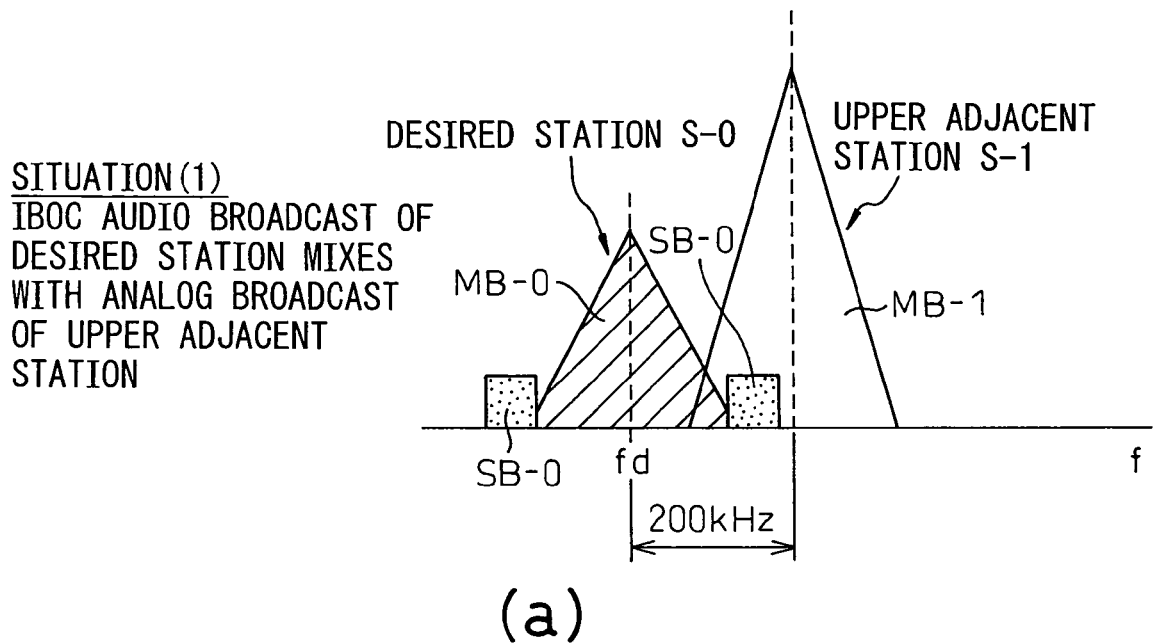
SITUATION (1)
IBOC AUDIO BROADCAST OF DESIRED STATION MIXES WITH ANALOG BROADCAST OF UPPER ADJACENT STATION
(a)
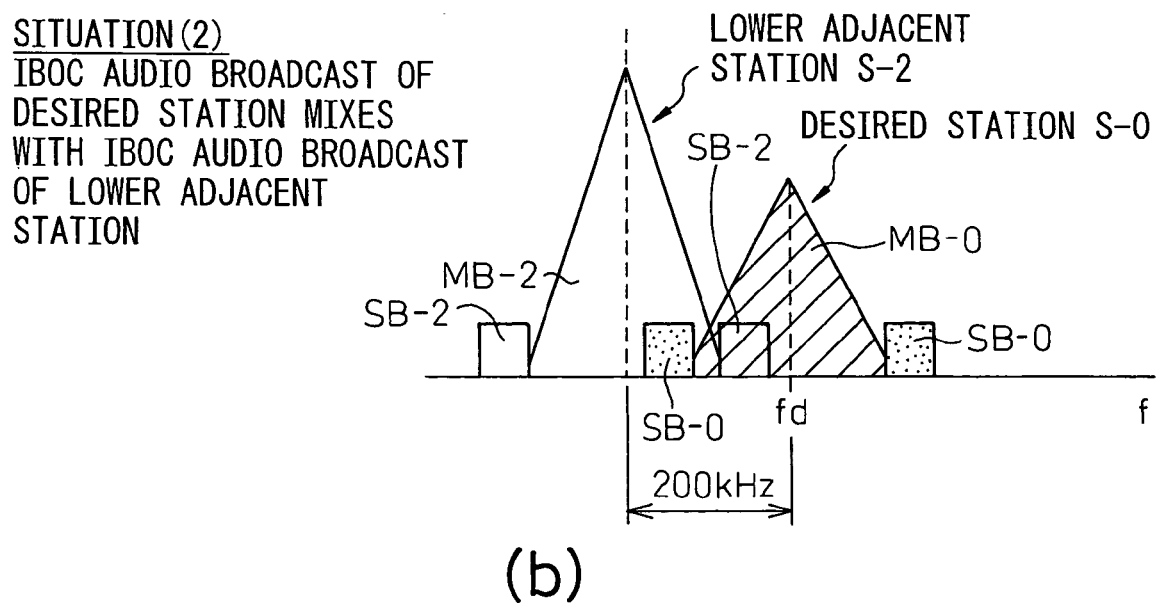
SITUATION (2)
IBOC AUDIO BROADCAST OF DESIRED STATION MIXES WITH IBOC AUDIO BROADCAST OF LOWER ADJACENT STATION
(b)

US 7,224,939 B2

AUDIO BROADCAST RECEIVING APPARATUS AND METHOD

This application claims priority to Japanese Patent Application No. JP-2003-392426 filed on Nov. 21, 2003.

BACKGROUND OF THE INVENTION

1. Field of the Invention

The present invention relates to an audio broadcast receiving apparatus and to a method for receiving an analog audio broadcast radio wave in a specified frequency band (channel) while, at the same time, receiving and demodulating a digital audio broadcast radio wave such as the terrestrial digital broadcast signal transmitted in parallel with the analog audio broadcast in the particular frequency band thereby to retrieve intended audio information (audio data).

In North America, the IBOC (in-band on-channel) scheme is currently employed, in which a radio wave containing an analog modulated wave in a specified frequency band is transmitted for an analog audio broadcast such as an AM (amplitude modulation) radio broadcast or an FM (frequency modulation) radio broadcast, while a radio wave containing a digital modulated wave for the digital audio broadcast can be transmitted by multiplexing using the scheme called the OFDM (orthogonal frequency division multiplexing) at the same time and in the same frequency band.

In particular, this invention relates to a technique for suppressing the mixing between a broadcast station in the channel desired by the user and a broadcast station in an adjacent channel while receiving the analog audio broadcast and the digital audio broadcast transmitted at the same time using, for example, the IBOC scheme.

2. Description of the Related Art

To facilitate understanding of the problems of the conventional audio broadcast receiving apparatus of the IBOC scheme, the configuration and operation of the conventional audio broadcast receiving apparatus of the IBOC scheme are explained below with reference to FIGS. 1 to 6 that will be described in "BRIEF DESCRIPTION OF THE DRAWINGS" later.

FIG. 1 illustrates a schematic diagram for explaining an outline of the IBOC scheme used for the terrestrial digital broadcast in North America. The explanation refers to the IBOC scheme currently employed in North America, in which the radio wave in a specified frequency band (spectrum mask) of the existing FM radio broadcast is transmitted by multiplexing with the radio wave of the terrestrial digital broadcast in the same frequency band. In this IBOC scheme, generally, the analog modulated wave of the existing FM radio broadcast is transmitted in the frequency band of one of a plurality of channels, while the digital modulated wave of the digital audio broadcast such as the terrestrial digital broadcast is transmitted at the same time in the same frequency band.

Specifically, as shown in FIG. 1, the analog modulated wave of the FM radio broadcast is transmitted in the central band MB in a given frequency band, while the digital modulated wave of the digital audio broadcast is transmitted in the upper and lower sidebands SB of the particular frequency band. The transmission power Ps and the frequency band of these analog and digital modulated waves are limited by the spectrum mask SM standardized by the Federal Communications Commission (FCC).

More specifically, the frequency bandwidth (frequency f along abscissa in FIG. 1) of a given channel is set at about 440 kHz (±220 kHz from the central channel) based on the spectrum mask SM. Further, the frequency bandwidth of the analog modulated wave of the FM radio broadcast is set at about 220 kHz (about ±110 kHz from the central frequency) in the central band MB based on the spectrum mask SM. The frequency bandwidth of the digital modulated wave of the digital audio broadcast, on the other hand, is set at about 90 kHz (about 130 to 220 kHz lower than the central channel for the lower sideband, and about 130 to 220 kHz higher than the central channel for the upper sideband) in each of the lower and upper side bands SB based on the spectrum mask SM.

Further, in the IBOC scheme shown in FIG. 1, the digital modulated wave of the digital audio broadcast is transmitted with a power about 22 dB (−2.5 dB/kHz) smaller than the analog modulated wave of the FM broadcast based on the spectrum mask SM.

The frequency interval between a broadcast station of a given channel and another broadcast station of an adjacent channel is set to 200 kHz. In an actual broadcast receiving apparatus, the effects of adjacent channels are reduced as far as possible by selectively passing the analog modulated wave and the digital modulated wave existing in a frequency band of not more than about 400 kHz (about ±199 kHz from the central channel) using a bandpass filter (FIGS. 2 and 4).

FIG. 2 illustrates a block diagram showing a configuration of the conventional audio broadcast receiving apparatus of the IBOC scheme, FIG. 3 a diagram showing the receiving characteristics of the conventional audio broadcast receiving apparatus of the IBOC scheme, and FIG. 4 a diagram showing the frequency characteristic of the bandpass filter shown in FIG. 2.

In FIG. 2, however, the configuration of the conventional audio broadcast receiving apparatus of IBOC scheme is shown in simple fashion. The analog audio broadcast received by this audio broadcast receiving apparatus of IBOC scheme is considered to include the FM radio broadcast (carrier frequency of 88 to 108 MHz) and the AM radio broadcast (carrier frequency of 530 to 1700 kHz). In the case under consideration, however, the FM radio broadcast receiving apparatus is explained.

The audio broadcast receiving apparatus shown in FIG. 2 includes a tuner 100 for receiving the analog modulated wave of the FM radio broadcast and the digital modulated wave of the digital audio broadcast transmitted using the IBOC scheme, and a demodulator 550 for retrieving the intended audio information by demodulating the receiving signal Sr received through the tuner 100.

More specifically, the tuner 100 of the audio broadcast receiving apparatus shown in FIG. 2 includes a channel select processing unit for selectively retrieving the analog modulated wave and the digital modulated wave in the frequency band of a specific channel from a plurality of channels of the FM radio broadcast received through an antenna AT, and a radio-frequency signal/intermediate frequency signal converter for converting the analog modulated wave and the digital modulated wave (radio-frequency signal) in the frequency band of the particular channel into an intermediate frequency signal. The value of the intermediate frequency of the intermediate frequency signal is set to, for example, 10.7 MHz.

The intermediate frequency signal (the receiving signal Sr) retrieved from the radio-frequency signal/intermediate frequency signal converter in the tuner 100 is passed through a bandpass filter for the intermediate frequency signal (hereinafter referred to as the IF bandpass filter) 200. In this way, the intermediate frequency signal Sf containing the analog modulated wave and the digital modulated wave existing in the frequency band of about 400 kHz of a specific channel is selectively retrieved. Further, the intermediate frequency signal Sf retrieved from the IF bandpass filter 200 is amplified to a predetermined level by an intermediate frequency amplifier (hereinafter referred to as the IF amplifier) 300, and input to a demodulator 550.

The intermediate frequency signal Sg output from the IF amplifier 300 is input to an intermediate frequency automatic gain control unit (hereinafter referred to as the IF AGC) 400, and fed back to the IF amplifier 300. The IF AGC 400 has the function of controlling the gain (amplification degree) of the IF amplifier 300 automatically in accordance with the level of the intermediate frequency signal Sg. The gain of the IF amplifier 300 can also be controlled automatically by supplying the IF AGC 400 with the intermediate frequency signal from an analog IF signal processing unit 500 described later.

In the IF bandpass filter 200, the IF amplifier 300 and the IF AGC 400, the intermediate frequency signal containing the analog modulated wave and the digital modulated wave existing in the frequency band of about 400 kHz of a specific channel is retrieved, and the output level of the intermediate frequency signal containing the analog modulated wave and the digital modulated wave is adjusted automatically.

The demodulator 550 of the audio broadcast receiving apparatus shown in FIG. 2, on the other hand, includes an analog-to-digital converter 350 for the intermediate frequency signal (hereinafter referred to as the IF A/D) for converting the analog modulated wave contained in the intermediate frequency signal Sg output from the IF amplifier 300 into the intermediate frequency signal Sdi in digital form, an analog intermediate frequency signal processing unit (hereinafter referred to as the analog IF signal processing unit) 500 for demodulating the digital intermediate frequency signal Sdi and retrieving the analog audio signal Saa, and a digital intermediate frequency signal processing unit (hereinafter referred to as the digital IF signal processing unit) 600 for demodulating the digital modulated wave contained in the intermediate frequency signal Sg output from the IF amplifier 300 and retrieving the digital audio signal Sda through a sampling rate converter 660. This digital IF signal processing unit 600 also decodes the channel selected by the tuner 100 and applies it, as a channel decode signal Sch, to the audio signal mixer 700.

It should be noted that the digital modulated wave contained in the intermediate frequency signal Sg is passed as it is through the IF A/D 350 and the analog IF signal processing unit 500, and input to the digital IF signal processing unit 600 as a quadrature modulation signal of OFDM scheme with the data arranged along I axis (time axis) and Q axis (frequency axis).

Further, the demodulator 550 of the audio broadcast receiving apparatus shown in FIG. 2 includes an audio signal mixer 700 for mixing, by blending, the analog audio signal Saa retrieved from the analog IF signal processing unit 500 with the digital audio signal Sda retrieved from the digital IF signal processing unit 600, and an audio signal processing unit 800 for generating the audio information Sdp containing the intended sound by filtering, with a digital filter or the like, the mixed audio signal Sb mixed by the audio signal mixer 700. The audio signal mixer 700 and the audio signal processing unit 800 are normally configured of a digital signal processor (normally referred to as DSP) for processing the digital signal.

In the digital IF signal processing unit 600, the quadrature modulation signal is demodulated at the sampling rate (sampling frequency) of about 1 MHz. In the analog IF signal processing unit 500, on the other hand, the intermediate frequency signal is demodulated at the sampling rate of about 44 kHz. Before the blending operation by the audio signal mixer 700, therefore, the sampling rate of the demodulation processing signal Spa retrieved from the digital IF signal processing unit 600 must be adjusted to the sampling rate of the analog audio signal Saa retrieved from the analog IF signal processing unit 500. Thus, the demodulation processing signal Spa retrieved from the digital IF signal processing unit 600 is down-sampled by the sampling rate converter 660 and then input to the audio signal mixer 700 as a digital audio signal Sda having substantially the same sampling rate as the analog audio signal Saa.

Further, in the audio broadcast receiving apparatus shown in FIG. 2, the audio information Sdp in digital form retrieved from the audio signal processing unit 800 is converted to the audio information Ad in analog form by the digital-to-analog converter (abbreviated to D/A in FIG. 2) 820. The audio information Ad in analog form retrieved from the A/D converter 820 is finally input to a speaker 840, so that the sound of the analog audio broadcast and the digital audio broadcast of the broadcast station desired by the user is output from the speaker 840.

Furthermore, the audio broadcast receiving apparatus shown in FIG. 2 comprises a control unit 900 for controlling a series of operation of each component element of the audio broadcast receiving apparatus 110 based on various types of control signal Sco. The control unit 900 is normally implemented by a central processing unit (CPU).

Now, with reference to the receiving characteristic diagram of FIG. 3, an explanation is given, about the receiving characteristic, on the assumption that an analog modulated wave (hereinafter sometimes referred to as the analog wave as required) of the analog audio broadcast such as the FM radio broadcast and a digital modulated wave (hereinafter sometimes referred to as the digital wave as required) of the digital audio broadcast are received at the same time using the conventional audio broadcast receiving apparatus shown in FIG. 2.

FIG. 3 illustrates a graph showing the relation between the distance from the broadcast station desired by the user and the quality of the sound received from by the conventional audio broadcast receiving apparatus. As apparent from the graph of FIG. 3, as far as the digital wave containing the digital audio signal is concerned, a digital wave of comparatively high sound quality can be received in the case in which the broadcast station desired by the user is located at a short distance while, with an increase of the distance from the particular broadcast station to more than a predetermined value, the sound quality is sharply deteriorated and the digital wave can no longer be received. With regard to the analog wave containing the analog audio signal, on the other hand, the sound quality of the analog wave received is gradually reduced with the increase in the distance from the broadcast station desired by the user.

In other words, a digital audio signal of comparatively high sound quality can be received in a medium or stronger electric field when the distance is small, from the broadcast station, while the analog audio signal can be received in the weak or lower electric field when the distance is large from the broadcast station.

In the case in which the analog audio signal and the digital audio signal having the receiving characteristic described above are mixed, by blending, in the audio signal mixer 700, the audio signal is digitized by preferentially retrieving the digital audio signal (see the area advantageous for the user in FIG. 3) having a higher sound quality than the analog audio signal in the medium or stronger electric field. As a result, the sound quality in the medium or stronger electric field is improved. In the weak or lower electric field, on the other hand, the digital audio signal cannot be received and is automatically switched to the analog audio signal, and therefore, the service area remains the same as that of the ordinary FM radio broadcast and the AM radio broadcast.

Further, the frequency characteristic of the IF bandpass filter 200 shown in FIG. 2 is explained with reference to FIG. 4. As shown in portion (a) of FIG. 4, only the analog wave existing in the band MB in the frequency band of a specific channel of the FM radio broadcast can be selectively passed by setting the bandwidth of the IF bandpass filter to about 200 kHz. In the conventional audio broadcast receiving apparatus of IBOC scheme, however, both the analog wave existing in the band MB in the frequency band of the particular channel and the digital wave existing in the upper and lower sidebands SB are required to be passed through the IF bandpass filter. As shown in portion (b) of FIG. 4, therefore, the bandwidth of the IF bandpass filter is required to be set to about 400 kHz.

This makes it necessary to make the bandwidth of the IF bandpass filter wider than in the case in which only the analog wave is passed. As described above, the frequency interval between the broadcast station of a given channel and the broadcast station of an adjacent channel is only 200 kHz. As a result, the interference may occur between the broadcast station of the channel desired by the user (hereinafter referred to as the desired station, as required) and the broadcast station of an adjacent channel (hereinafter referred to as an adjacent station, as required).

FIGS. 5 and 6 illustrate first and second schematic diagrams, respectively, for explaining the problems of the prior art. With reference to the schematic diagrams of FIGS. 5 and 6, an explanation is given about the problem points posed in the case in which the analog wave and the digital wave of the desired station are received using the conventional audio broadcast receiving apparatus of IBOC scheme.

As shown in FIG. 5 and portion (a) of FIG. 6, assume that a mobile unit C receiving the analog audio broadcast signal and the digital audio broadcast signal of IBOC scheme transmitted in the frequency band (the central frequency fd of the channel) of the channel of the desired station S-0 is approaching a broadcast station adjacent to the upper sideband (central frequency fd of the channel plus 200 kHz) in the frequency band of the desired station S-0 (situation (1)). Also, assume that the upper adjacent station S-1 transmits only the analog audio broadcast signal.

With the approach of the mobile unit C to the upper adjacent station S-1, the receiving strength of the analog wave of the central band MB-1 in the frequency band of the upper adjacent station S-1 increases. As the mobile unit C moves farther away from the desired station S-0 (partly under the effect of a building H), on the other hand, the receiving field strength of the digital wave of the upper sideband SB-0 in the frequency band of the desired station S-0 decreases. When receiving the digital wave of the upper sideband SB-0 in the frequency band of the desired station S-0, therefore, the analog wave of the band MB-1 of the upper adjacent station S-1 is received at the same time, thereby interfering with the receiving of the digital wave of the desired station S-0. This interference by the upper adjacent station S-1 causes a radio interference between the desired station S-0 and the upper adjacent station S-1 and poses the problem that the digital wave of the digital audio broadcast of the desired station S-0 cannot be received.

Further, the analog wave of the upper adjacent station S-1 intrudes, as noise, into the frequency band portion of the upper sideband SB-0 of the desired station S-0, and therefore, the gain of the IF amplifier 300 (FIG. 2) is adjusted downward automatically by the IF AGC 400. As a result, the receiving strength of the analog wave in the band MB-1 of the desired station S-0 becomes weak, and the analog wave of the analog audio broadcast of the desired station S-0 also becomes difficult to receive. In addition, intermodulation occurs between the analog wave in the band MB-1 of the upper adjacent station S-1 and the analog wave in the band MB-1 of the desired station S-0, thereby posing another problem that the analog wave of the analog audio broadcast of the desired station S-0 cannot be received.

As shown in FIG. 5 and portion (b) of FIG. 6, on the other hand, assume that a mobile unit C receiving the analog audio broadcast signal and the digital audio broadcast signal of IBOC scheme transmitted in the frequency band (the central frequency fd of the channel) of the channel of the desired station S-0 approaches a broadcast station adjacent to the lower sideband (i.e. the lower adjacent station) (central frequency fd of the channel less 200 kHz) in the frequency band of the desired station S-0 (situation (2)). Also, assume that the lower adjacent broadcast station S-2 transmits both the analog audio broadcast signal and the digital audio broadcast signal of IBOC scheme.

With the approach of the mobile unit C to the lower adjacent station S-2, the receiving strength of the digital wave of the upper sideband MB-2 in the frequency band of the lower adjacent station S-2 increases. On the other hand, the receiving field strength of the digital wave of the lower sideband SB-0 in the frequency band of the desired station S-0 decreases. When receiving the digital wave of the lower sideband SB-0 of the desired station S-0, therefore, the digital wave of the upper sideband SB-2 of the lower adjacent station S-2 is received at the same time, thereby interfering with the receipt of the digital wave of the desired station S-0. This interference by the lower adjacent station S-2 causes a radio interference between the desired station S-0 and the lower adjacent station S-2 and poses the problem that the digital wave of the digital audio broadcast of the desired station S-0 cannot be received.

Further, the interference by the lower adjacent station S-2 causes intermodulation between the analog wave in the band MB-2 of the lower adjacent station S-2 and the analog wave in the band MB-0 of the desired station S-0, thereby posing another problem that the analog wave of the analog audio broadcast of the desired station S-0 cannot be received.

As described above, the conventional audio broadcast receiving apparatus of IBOC scheme poses the problem that in the case in which an adjacent station transmits only the analog audio broadcast signal, and in the case in which it transmits the analog audio broadcast signal and the digital audio broadcast signal of IBOC scheme, interference and intermodulation occur between the desired station and the adjacent station, thereby making it impossible to receive the analog audio broadcast and the digital audio broadcast of IBOC scheme from the desired station in stable fashion.

For reference, three patent documents (Patent Documents 1 to 3) containing the description of the techniques relating to the audio broadcast receiving apparatus having the IF bandpass filter are listed below.

Patent Document 1 (Japanese Unexamined Utility Model Publication (Kokai) No. 5-18135) discloses a configuration of the FM receiver in which the lock range of the PLL detection circuit is limited to a smaller value than the IF bandwidth by a band limiter to remove the adjacent interference signal that cannot be removed in the IF band. Patent Document 2 (Japanese Unexamined Patent Publication (Kokai) No. 5-199134), on the other hand, discloses a configuration of the FM receiver in which the noise due to the interference of an adjacent station is removed by switching the IF band amplifier. Also, Patent Document 3 (Japanese Unexamined Patent Publication (Kokai) No. 7-193518) discloses a configuration of the AM receiver in which the resultant output signal obtained by adding a signal output from a wide band IF filter and another signal output from a narrow band IF filter, after changing the ratio of the former signal level with respect to the latter signal level, is used as an intermediate frequency signal.

All of Patent Documents 1 to 3, however, fail to refer to the configuration of the audio broadcast receiving apparatus of IBOC scheme, and have a different object and a different configuration from this invention. Further, in the configuration disclosed in Patent Document 3, unlike the audio broadcast receiving apparatus according to the invention, the wide band IF filter and the narrow band IF filter are not operated independently of each other.

SUMMARY OF THE INVENTION

This invention has been developed in view of the problems described above, and the object thereof is to provide an audio broadcast receiving apparatus and method in which the interference and the intermodulation between the broadcast station desired by the user and an adjacent broadcast station are suppressed, so that the analog audio broadcast and the digital audio broadcast of IBOC scheme, for example, of the broadcast station desired by the user can be received in stable fashion.

In order to achieve this object, according to a first aspect of the invention, there is provided an audio broadcast receiving apparatus comprising:
 a tuner for simultaneously receiving an analog audio broadcast radio wave and a digital broadcast radio wave transmitted in parallel with the analog audio broadcast radio wave in a specific frequency band;
 a demodulator for retrieving the intended audio information by demodulating the receiving signal received by the tuner;
 an analog receiving signal bandpass filter for selectively passing the receiving signal corresponding to the analog audio broadcast radio wave;
 an analog receiving signal amplifier for amplifying the receiving signal passed through the analog receiving signal bandpass filter and outputting an output signal to the demodulator, the analog receiving signal amplifier having the gain thereof controlled in accordance with the level of the output signal;
 a digital receiving signal bandpass filter for selectively passing the receiving signal corresponding to the digital audio broadcast radio wave; and
 a digital receiving signal amplifier for amplifying the receiving signal passed through the digital receiving signal bandpass filter and outputting an output signal to the demodulator, the digital receiving signal amplifier having the gain thereof controlled in accordance with the level of the output signal.

Preferably, in the audio broadcast receiving apparatus according to the first aspect of the invention, the reference level of the output signal of the digital receiving signal amplifier used for controlling the gain thereof is set to a value lower than the reference level of the output signal of the analog receiving signal amplifier used for controlling the gain thereof.

Further, preferably, in the audio broadcast receiving apparatus according to the first aspect of the invention, the reference level of the output signal of the digital receiving signal amplifier used for controlling the gain thereof when the digital broadcast radio wave is not actually transmitted is set to a value lower than when the digital broadcast radio wave is transmitted.

Furthermore, preferably, the audio broadcast receiving apparatus according to the first aspect of the invention further comprises an adder for adding the output signal of the analog receiving signal amplifier and the output signal of the digital receiving signal amplifier, and the sum signal produced from the adder is supplied to the demodulator.

According to a second aspect of the invention, there is provided an audio broadcast receiving apparatus comprising:
 a tuner for simultaneously receiving the analog audio broadcast radio wave in a specific frequency band and the digital broadcast radio wave transmitted in the lower sideband and the upper sideband in the specific frequency band in parallel with each other;
 a demodulator for retrieving the intended audio information by demodulating the receiving signal received by the tuner;
 an analog receiving signal bandpass filter for selectively passing the receiving signal corresponding to the analog audio broadcast radio wave;
 an analog receiving signal amplifier for amplifying the receiving signal passed through the analog receiving signal bandpass filter and outputting an output signal to the demodulator, the analog receiving signal amplifier having the gain thereof controlled in accordance with the level of the output signal;
 a first digital receiving signal bandpass filter for selectively passing the receiving signal corresponding to the digital audio broadcast radio wave in the lower sideband;
 a first digital receiving signal amplifier for amplifying the receiving signal passed through the first digital receiving signal bandpass filter and outputting an output signal to the demodulator, the first digital receiving signal amplifier having the gain thereof controlled in accordance with the level of the output signal;
 a second digital receiving signal bandpass filter for selectively passing the receiving signal corresponding to the digital audio broadcast radio wave in the upper sideband; and
 a second digital receiving signal amplifier for amplifying the receiving signal passed through the second digital receiving signal bandpass filter and outputting an output signal to the demodulator, the second digital receiving signal amplifier having the gain thereof controlled in accordance with the level of the output signal.

Preferably, in the audio broadcast receiving apparatus according to the second aspect of the invention, each of the reference level of the output signal of the first digital receiving signal amplifier used for controlling the gain thereof and the reference level of the output signal of the second digital receiving signal amplifier used for controlling the gain thereof is set to a value lower than the reference level of the output signal of the analog receiving signal amplifier used for controlling the gain thereof.

Further, preferably, in the audio broadcast receiving apparatus according to the second aspect of the invention, each of the reference level of the output signal of the first digital receiving signal amplifier used for controlling the gain thereof and the reference level of the output signal of the second digital receiving signal amplifier used for controlling the gain thereof when the digital broadcast radio wave is not actually transmitted is set to a value lower than when the digital broadcast radio wave is transmitted.

Further, the audio broadcast receiving apparatus according to the second aspect of the invention preferably further comprises an adder for adding the output signal of the analog receiving signal amplifier, the output signal of the first digital receiving signal amplifier and the output signal of the second digital receiving signal amplifier, wherein the sum of the output signals is applied to the demodulator.

According to a third aspect of the invention, there is provided an audio broadcast receiving method comprising:

causing a tuner to simultaneously receive the analog audio broadcast radio wave and the digital broadcast radio wave transmitted in parallel with the analog audio broadcast radio wave in a specific frequency band;

causing a demodulator to demodulate the signal received by the tuner and retrieve the intended audio information;

causing an analog receiving signal bandpass filter to selectively pass the receiving signal corresponding to the analog audio broadcast radio wave;

causing an analog receiving signal amplifier to amplify the receiving signal passed through the analog receiving signal bandpass filter with a gain controlled in accordance with the output signal of the analog receiving signal amplifier and input the amplified signal to the demodulator;

causing a digital receiving signal bandpass filter to selectively pass the receiving signal corresponding to the digital audio broadcast radio wave; and causing a digital receiving signal amplifier to amplify the receiving signal passed through the digital receiving signal bandpass filter with a gain controlled in accordance with the output signal of the digital receiving signal amplifier and input the amplified signal to the demodulator.

Alternatively, according to this invention, there is provided an audio broadcast receiving method comprising:

causing a tuner to simultaneously receive an analog audio broadcast radio wave in a specific frequency band and a digital broadcast radio waves in the lower sideband and the upper sideband transmitted in parallel with each other in the specific frequency band;

causing a demodulator to demodulate the receiving signal received by the tuner thereby to retrieve the intended audio information;

causing an analog receiving signal bandpass filter to selectively pass the receiving signal corresponding to the analog audio broadcast radio wave;

causing an analog receiving signal amplifier to amplify the receiving signal passed through the analog receiving signal bandpass filter with a gain controlled in accordance with the output signal of the analog receiving signal amplifier and input the amplified signal to the demodulator;

causing a first digital receiving signal bandpass filter to selectively pass the receiving signal corresponding to the digital audio broadcast radio wave in the lower sideband;

causing a first digital receiving signal amplifier to amplify the receiving signal passed through the first digital receiving signal bandpass filter with a gain controlled in accordance with the output signal of the first digital receiving signal amplifier and inputs the amplified signal to the demodulator;

causing a second digital receiving signal bandpass filter to selectively pass the receiving signal corresponding to the digital audio broadcast radio wave in the upper sideband;

and causing a second digital receiving signal amplifier to amplify the receiving signal passed through the second digital receiving signal bandpass filter with a gain controlled in accordance with the output signal of the second digital receiving signal amplifier and input the amplified signal to the demodulator.

To summarize, according to this invention, the operation of automatically controlling the gain of the amplifier dedicated to the analog receiving signal and the operation of automatically controlling the gain of the amplifier dedicated to the digital receiving signal can be performed independently of each other by providing a bandpass filter dedicated to the analog receiving signal (such as the analog intermediate frequency signal), an amplifier dedicated to the analog receiving signal and a bandpass filter dedicated to the digital receiving signal (such as the digital intermediate frequency signal) independently of each other. As a result, the interference or the intermodulation hardly occurs between the broadcast station desired by the user and an adjacent broadcast station, so that the receiving characteristic of the analog and digital audio broadcast of the broadcast station desired by the user are remarkably improved.

Also, according to this invention, the bandpass filter and the amplifier dedicated to the analog receiving signal, the bandpass filter and the amplifier dedicated to the first digital receiving signal in the lower sideband of the digital audio broadcast signal, and the bandpass filter and the amplifier dedicated to the second digital receiving signal in the upper sideband of the digital audio broadcast signal are provided independently of each other. As a result, the operation of automatically controlling the gain of the amplifier dedicated to the analog receiving signal, the operation of automatically controlling the gain of the amplifier dedicated to the first digital receiving signal and the operation of automatically controlling the gain of the amplifier dedicated to the second digital receiving signal can be performed independently of each other. Thus, the receiving characteristic of the analog audio broadcast and the digital audio broadcast desired by the user is further improved.

Further, according to this invention, only a part of the components elements of the bandpass filter and the amplifier dedicated to the analog receiving signal and the bandpass filter and the amplifier dedicated to the digital receiving signal are provided independently of each other in the audio broadcast receiving apparatus of IBOC scheme. Therefore, the apparatus configuration is more simple than the configuration in which the audio broadcast receiving apparatus dedicated to the analog receiving signal and the audio broadcast receiving apparatus dedicated to the digital receiving signal are arranged independently of each other.

BRIEF DESCRIPTION OF THE DRAWINGS

The above object and features of the present invention will be more apparent from the following description of some preferred embodiments with reference to the accompanying drawings, wherein:

FIG. 3 is a diagram showing the receiving characteristic of the conventional audio broadcast receiving apparatus of IBOC scheme;

FIG. 4 is diagram showing the frequency characteristic of the bandpass filter shown in FIG. 2;

FIG. 6 is a second schematic diagram for explaining the problem points of the prior art;

DESCRIPTION OF THE PREFERRED EMBODIMENTS

Hereinafter, the description of some preferred embodiments according to the present invention will be given with reference to the accompanying drawings (FIGS. 7 to 12).

Figure 7:
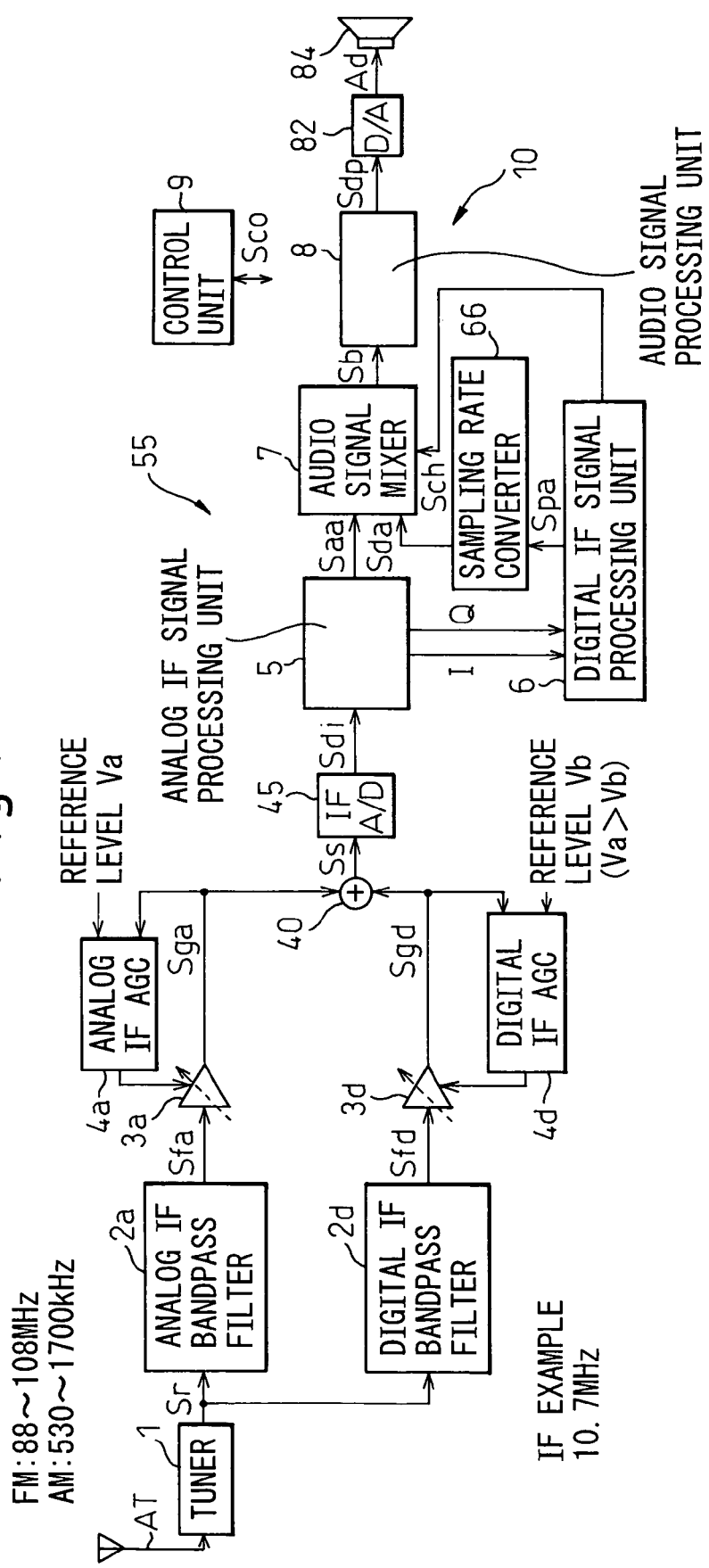
FIG. 7 is a block diagram showing a configuration of a first embodiment of the invention.

FIG. 7 is a block diagram showing a configuration of a first embodiment of the invention. In this embodiment, the configuration of the audio broadcast receiving apparatus 10 of the IBOC scheme according to the first embodiment of the invention is shown in a simple fashion. A typical example of the analog audio broadcast received by the audio broadcast receiving apparatus 10 of the IBOC scheme is the FM radio broadcast (carrier frequency of 88 to 108 MHz) and the AM radio broadcast (carrier frequency of 530 to 1700 kHz), and a typical example of the digital audio broadcast is the terrestrial digital broadcast. In the description that follows, similar or identical component elements are designated by the same reference numerals, respectively.

The audio broadcast receiving apparatus shown in FIG. 17 comprises a tuner 1 for receiving the analog modulated wave of the analog audio broadcast and the digital modulated wave of the digital audio broadcast transmitted using the IBOC scheme at the same time, and a demodulator 55 for demodulating the receiving signal Sr received by the tuner 1 and retrieving the intended audio information.

Figure 2:
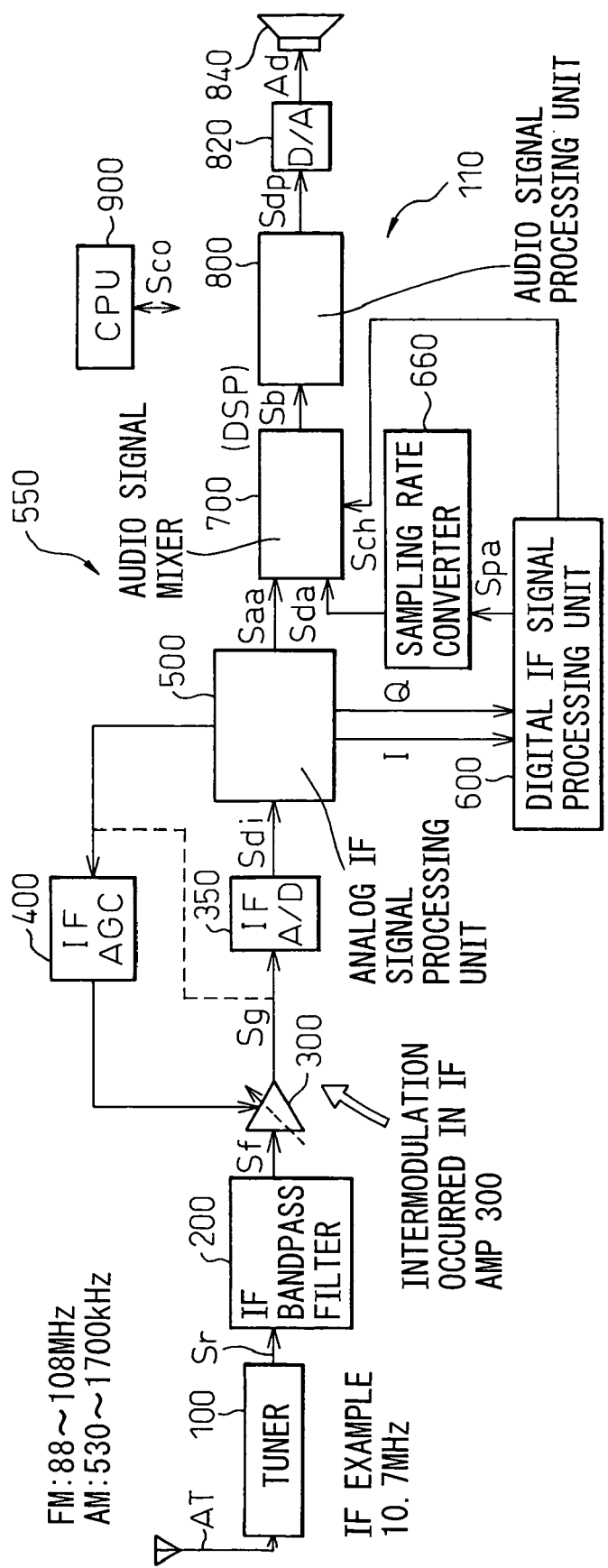
FIG. 2 is a block diagram showing a configuration of the conventional audio broadcast receiving apparatus of IBOC scheme.
Figure 5:
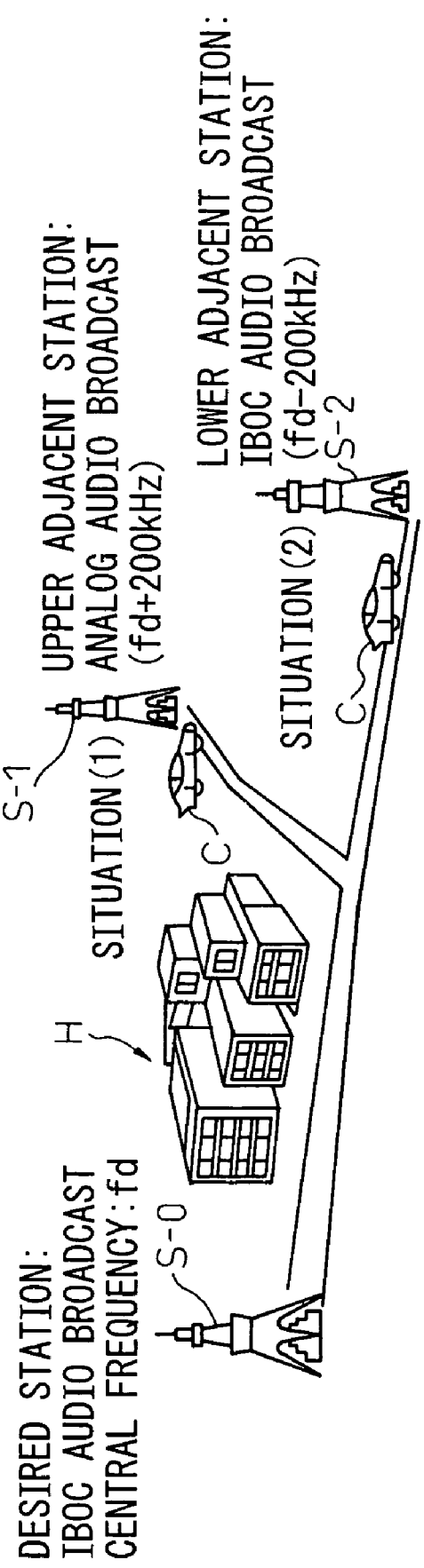
FIG. 5 is a first schematic diagram for explaining the problem points of the prior art.

Specifically, the tuner 1 of the audio broadcast receiving apparatus shown in FIG. 7 includes a channel select processing unit for selectively retrieving the analog modulated wave and the digital modulated wave in the frequency band of a specific channel from a plurality of channels of the FM radio broadcast received through an antenna AT, and a radio frequency signal/intermediate frequency signal converter for converting the analog modulated wave and the digital modulated wave in the frequency band of the particular channel into an intermediate frequency signal. The value of the intermediate frequency of the intermediate frequency signal is set to, for example, 10.7 MHz. The tuner 1 substantially corresponds to the tuner 100 of the conventional audio broadcast receiving apparatus described above (FIG. 2).

Further, the audio broadcast receiving apparatus shown in FIG. 7 comprises an analog intermediate frequency signal bandpass filter (hereinafter referred to as the analog IF bandpass filter) 2a for selectively passing the analog intermediate frequency signal containing the analog modulated wave retrieved from the tuner 1, and an analog intermediate frequency signal amplifier (hereinafter referred to as the analog IF amplifier) 3a for amplifying the analog intermediate frequency signal Sfa passed through the analog IF bandpass filter 2a.

The audio broadcast receiving apparatus shown in FIG. 7 further comprises a digital intermediate frequency signal bandpass filter (hereinafter referred to as the digital IF bandpass filter) 2d for selectively passing the digital intermediate frequency signal containing the digital modulated wave retrieved from the tuner 1, and a digital intermediate frequency signal amplifier (hereinafter referred to as the digital IF amplifier) 3d for amplifying the digital intermediate frequency signal Sfd passed through the digital IF bandpass filter 2d.

The analog IF bandpass filter 2a, the analog IF amplifier 3a, the digital IF bandpass filter 2d and the digital IF amplifier 3d are arranged independently of each other.

Furthermore, the audio broadcast receiving apparatus shown in FIG. 7 comprises, independently of each other, an analog intermediate frequency automatic gain control unit (hereinafter referred to as the analog IF AGC) 4a for automatically controlling the gain of the analog IF amplifier 3a in accordance with the level of the output signal Sga of the digital IF amplifier 3a and a digital intermediate frequency automatic gain control unit (hereinafter referred to as the digital IF AGC) 4d for automatically controlling the gain of the digital IF amplifier 3d in accordance with the level of the output signal Sgd of the digital IF amplifier 3d. In addition, the apparatus comprises an adder 40 for adding the output signal Sga of the analog IF amplifier 3a and the output signal Sgd of the digital IF amplifier 3d to each other. The sum produced by the adder 40 is supplied to the demodulator 55.

In the audio broadcast receiving apparatus shown in FIG. 7, the analog intermediate frequency signal in the receiving signal Sr (intermediate frequency signal) retrieved from the tuner 1, by being passed through the analog IF bandpass filter 2a, is selectively retrieved as an analog intermediate frequency signal Sfa containing the analog modulated wave existing in the frequency band of about 200 kHz of a specific channel. Further, the analog intermediate frequency signal Sfa retrieved from the analog IF bandpass filter 2a is amplified to a predetermined level by the analog IF amplifier 3a.

The output signal Sga output from the analog IF amplifier 3a is input to the analog IF AGC 4a and fed back to the analog IF amplifier 3a. The analog IF AGC 4a makes it possible to automatically adjust the gain of the analog IF amplifier 3a in accordance with the level of the output signal Sga.

Also, in the audio broadcast receiving apparatus shown in FIG. 7, the digital intermediate frequency signal in the receiving signal Sr retrieved from the tuner 1, by being passed through the digital IF bandpass filter 2d, is selectively retrieved as a digital intermediate frequency signal Sfd containing the digital modulated wave existing in the sideband (narrower than 400 kHz) in the frequency band of a specific channel. Further, the digital intermediate frequency signal Sfd retrieved from the digital IF bandpass filter 2d is amplified to a predetermined level by the digital IF amplifier 3d.

The output signal Sgd output from the digital IF amplifier 3d is input to the digital IF AGC 4d and fed back to the digital IF amplifier 3*d*. The digital IF AGC 4*d* makes it possible to automatically adjust the gain of the digital IF amplifier 3*d* in accordance with the level of the output signal Sgd.

As described above, in the audio broadcast receiving apparatus shown in FIG. 7, the analog IF bandpass filter 2*a*, the analog IF amplifier 3*a* and the analog IF AGC 4*a* for processing the analog intermediate frequency signal are arranged independently of the digital IF bandpass filter 2*d*, the digital IF amplifier 3*d* and the digital IF AGC 4*d* for processing the digital signal. Therefore, the operation of controlling the gain of the analog IF amplifier 3*a* can be performed independently of the operation of controlling the gain of the digital IF amplifier 3*d*. Further, the analog IF bandpass filter 2*a* is adapted to selectively pass only the analog intermediate frequency signal, and the digital IF bandpass filter 2*d* adapted to selectively pass only the digital intermediate frequency signal. As a result, the bandwidth of each of the analog IF bandpass filter and the digital IF bandpass filter can be narrower as compared with the corresponding bandwidth of the conventional audio broadcast receiving apparatus.

Thus, the analog modulated wave and the digital modulated wave of an adjacent broadcast station are less likely to intrude, as noise, into the frequency band of the channel of the desired station. There may be a case in which the digital intermediate frequency signal can not be received due to the interference from an adjacent station. Even in such a case, the analog intermediate frequency signal selectively passed through the analog IF bandpass filter 2*a* can be received without being affected by the interference from the adjacent broadcast station.

In the audio broadcast receiving apparatus shown in FIG. 7, therefore, the interference and the intermodulation between the desired station and an adjacent station can be suppressed, and the receiving characteristic of the analog audio broadcast and the digital audio broadcast of the broadcast station desired by the user is remarkably improved.

In the IBOC scheme, as explained with reference to the schematic diagram of FIG. 1, the digital modulated wave of the digital audio broadcast is transmitted with smaller power than the analog modulated wave of the analog audio broadcast. In the case in which the analog modulated wave of the analog audio broadcast and the digital modulated wave of the digital audio broadcast are received and demodulated, the relation of power level between the analog modulated wave and the digital modulated wave at the time of transmission must be reproduced. The gain of the digital IF amplifier 3*d*, therefore, is required to be set to a value lower than the gain of the analog IF amplifier 3*a*.

From this point of view, the reference level Vb of the output signal Sgd of the digital IF amplifier 3*d* used for controlling the gain thereof is desirably set to a value lower than the reference level Va of the output signal Sga of the analog IF amplifier 3*a* used for controlling the gain thereof.

Further, in the case in which the digital modulated wave of the digital audio broadcast is not actually transmitted from the desired station but only the analog modulated wave of the analog audio broadcast, the power level of the digital modulated wave at the time of transmission is zero. In such a case, the reference level Vb of the output signal Sgd of the digital IF amplifier 3*d* is desirably set to a value much lower than the reference level Va of the output signal Sga of the analog IF amplifier 3*a* (i.e. to a value lower than in the case where the digital modulated wave of the digital audio broadcast is transmitted).

Furthermore, in the audio broadcast receiving apparatus shown in FIG. 7, the demodulator 55 includes an intermediate frequency signal A/D converter (hereinafter referred to as the IF A/D) 45 for temporarily converting the signal corresponding to the sum Ss output from the adder 40 into the intermediate frequency signal Sdi in digital form, an analog intermediate frequency signal processing unit (hereinafter referred to as the analog IF signal processing unit) 5 for demodulating the digital intermediate frequency signal Sdi and retrieving the analog audio signal Saa, and a digital intermediate frequency signal processing unit (hereinafter referred to as the digital IF signal processing unit) 6 for demodulating the digital intermediate frequency signal contained in the signal output from the adder 40 and retrieving the digital audio signal Sda through the sampling rate converter 66. This digital IF signal processing unit 6 also decodes the channel selected by the tuner 1 and sends it as a channel decode signal Sch to the audio signal mixer 7.

The IF A/D 45, the analog IF signal processing unit 5, the digital IF signal processing unit 6 and the sampling rate converter 66 substantially correspond to the IF A/D 350, the analog IF signal processing unit 500, the digital IF signal processing unit 600 and the sampling rate converter 660, respectively, of the conventional audio broadcast receiving apparatus described above (FIG. 12).

It should be noted that the digital intermediate frequency signal contained in the signal corresponding to the sum Ss is passed as it is through the IF A/D 45 and the analog IF signal processing unit 5, and input as a quadrature modulation signal of OFDM scheme to the digital IF signal processing unit 6 with the data arranged in the directions of I and Q axes.

Further, in the audio broadcast receiving apparatus shown in FIG. 7, the demodulator 55 includes an audio signal mixer 7 for mixing by blending the analog audio signal Saa retrieved from the analog IF signal processing unit 5 with the digital audio signal Sda retrieved from the digital IF signal processing unit 6, and an audio signal processing unit 8 for filtering, through a digital filter or the like, the mixed audio signal Sb from the audio signal mixer 7 and generating the audio information Sdp containing the intended sound. The audio signal mixer 7 and the audio signal processing unit 8 are preferably configured of a digital signal processing DSP (digital signal processor). The audio signal mixer 7 and the audio signal processing unit 8 substantially correspond to the audio signal mixer 700 and the audio signal processing unit 800, respectively, of the conventional audio broadcast receiving apparatus described above (FIG. 2).

The digital IF signal processing unit 6 demodulates the quadrature modulation signal at the sampling rate (sampling frequency) of about 1 MHz. In the analog IF signal processing unit 5, on the other hand, the intermediate frequency signal is demodulated at the sampling rate of about 44 kHz. Before performing the blend operation in the audio signal mixer 7, therefore, the sampling rate of the demodulation processing signal Spa retrieved from the digital IF signal processing unit 6 is required to be adjusted to the sampling rate of the analog audio signal Saa retrieved from the analog IF signal processing unit 5. For this purpose, the demodulation processing signal Spa retrieved from the digital IF signal processing unit 6, after being down-sampled by the sampling rate converter 66, is input to the audio signal mixer 7 as a digital audio signal Sda having about the same sampling rate as the analog audio signal Saa.

Further, in the audio broadcast receiving apparatus shown in FIG. 7, the audio information Sdp in digital form retrieved from the audio signal processing unit 8 is converted to the audio information Ad in analog form by the analog-to-digital converter (referred to as A/D in FIG. 2) 82. The audio information Ad in analog form retrieved from the digital-to-analog converter 82 is finally input to the audio output unit 84 such as a speaker. The sound of the analog audio broadcast and the digital audio broadcast of the desired station are thus output from the speaker 84.

Furthermore, the audio broadcast receiving apparatus shown in FIG. 7 comprises a control unit 9 for controlling a series of operations of each component element of the audio broadcast receiving apparatus 10 based on the various control signals Sco. This control unit 9 is desirably implemented by a CPU (central processing unit).

Based on the control operation of the CPU 9, the analog intermediate frequency signal is selectively passed through the analog IF bandpass filter, and the analog intermediate frequency signal that has passed through the analog IF bandpass filter is amplified by the analog IF amplifier and input to the demodulator. On the other hand, the digital intermediate frequency signal is selectively passed by the digital IF bandpass filter, and the digital intermediate frequency signal that has passed through the digital IF bandpass filter is amplified by the digital IF amplifier and input to the demodulator. The operation of controlling the gain of the analog IF amplifier automatically in accordance with the level of the output signal of the analog IF amplifier and the operation of controlling the gain of the digital IF amplifier automatically in accordance with the level of the output signal of the digital IF amplifier are performed independently of each other. In this way, the audio broadcast receiving method according to the first embodiment of the invention is implemented.

In the audio broadcast receiving apparatus according to the embodiment shown in FIG. 7, only a few component elements of the audio broadcast receiving apparatus of the IBOC scheme such as the analog IF bandpass filter and the analog IF amplifier for processing the analog intermediate frequency signal and the digital IF bandpass filter and the digital IF amplifier for processing the digital intermediate frequency signal are arranged independently of each other. Therefore, the system configuration is simple as compared with a configuration in which the audio broadcast receiving apparatus for receiving the analog modulated wave and the audio broadcast receiving apparatus for receiving the digital modulated wave are arranged independently of each other.

Figure 8:
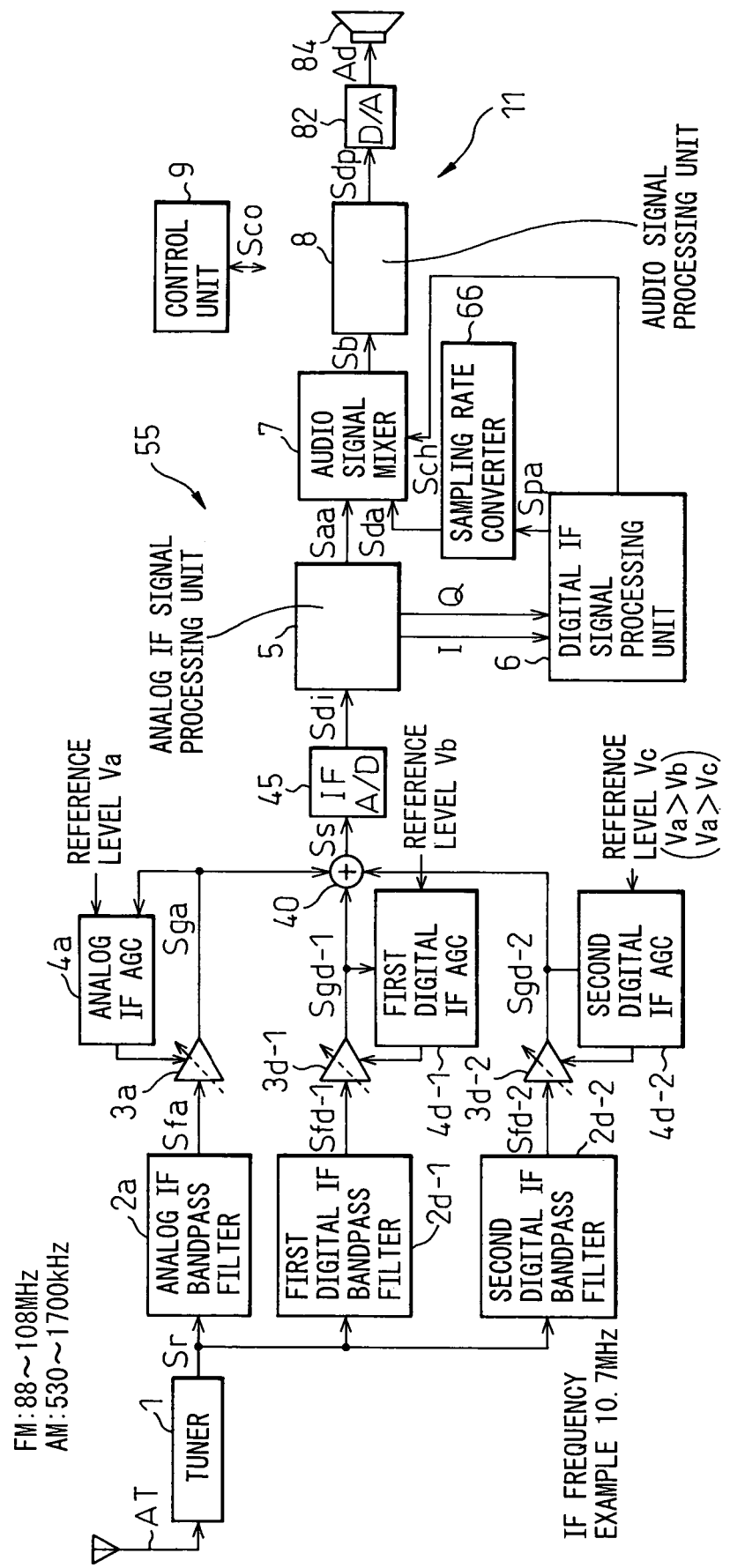
FIG. 8 is a block diagram showing a configuration of a second embodiment of the invention.

FIG. 8 is a block diagram showing a configuration of a second embodiment of the invention. Also in FIG. 8, the configuration of the audio broadcast receiving apparatus 11 of the IBOC scheme according to the second embodiment of the invention is shown in simplified way.

The audio broadcast receiving apparatus shown in FIG. 8 comprises a tuner 1 for simultaneously receiving the analog modulated wave of the analog audio broadcast, the digital modulated wave in the lower sideband of the digital audio broadcast and the digital modulated wave in the upper sideband of the digital audio broadcast transmitted by IBOC scheme, and a demodulator 55 for demodulating the receiving signal Sr received by the tuner 1 and retrieving the intended audio information. The configuration of the tuner 1 and each component part of the demodulator 55 is identical with the corresponding configuration in the embodiment shown in FIG. 1, and therefore not explained again.

Further, the audio broadcast receiving apparatus shown in FIG. 8, like the embodiment shown in FIG. 7, comprises an analog IF bandpass filter 2a for selectively passing the analog intermediate frequency signal containing the analog modulated wave retrieved from the tuner 1, and an analog IF amplifier 3a for amplifying the analog intermediate frequency signal Sfa passed through the analog IF bandpass filter 2a.

Furthermore, the audio broadcast receiving apparatus shown in FIG. 8 comprises a first digital intermediate frequency signal bandpass filter (hereinafter referred to as the first digital IF bandpass filter) 2d-1 for selectively passing the first digital intermediate frequency signal containing the digital modulated wave in the lower sideband retrieved from the tuner 1, and a first digital intermediate frequency signal amplifier (hereinafter referred to as the first digital IF amplifier) 3d-1 for amplifying the first digital intermediate frequency signal Sfd-1 passed through the first digital IF bandpass filter 2d-1.

In addition, the audio broadcast receiving apparatus shown in FIG. 8 comprises a second digital intermediate frequency signal bandpass filter (hereinafter referred to as the second digital IF bandpass filter) 2d-2 for selectively passing the second digital intermediate frequency signal containing the digital modulated wave in the upper sideband retrieved from the tuner 1, and a second digital intermediate frequency signal amplifier (hereinafter referred to as the second digital IF amplifier) 3d-2 for amplifying the second digital intermediate frequency signal Sfd-2 passed through the second digital IF bandpass filter 2d-2.

The analog IF bandpass filter 2a, the analog IF amplifier 3a, the first digital IF bandpass filter 2d-1, the first digital IF amplifier 3d-1, the second digital IF bandpass filter 2d-2 and the second digital IF amplifier 3d-2 are arranged independently of each other.

The audio broadcast receiving apparatus shown in FIG. 8, like the embodiment shown in FIG. 7, comprises an analog IF AGC 4a for controlling the gain of the analog IF amplifier 3a automatically in accordance with the level of the output signal Sga of the analog IF amplifier 3a.

Further, the audio broadcast receiving apparatus shown in FIG. 8 comprises a first digital intermediate frequency automatic gain control unit (hereinafter referred to as the first digital IF AGC) 4d-1 for controlling the gain of the first digital IF amplifier 3d-1 automatically in accordance with the level of the first digital output signal Sgd-1 of the first digital IF amplifier 3d-1.

Furthermore, the audio broadcast receiving apparatus shown in FIG. 8 comprises a second digital intermediate frequency automatic gain control unit (hereinafter referred to as the second digital IF AGC) 4d-2 for controlling the gain of the second digital IF amplifier 3d-2 automatically in accordance with the level of the second digital output signal Sgd-2 of the second digital IF amplifier 3d-2.

The analog IF AGC 4a, the first digital IF AGC 4d-1 and the second digital IF AGC 4d-2 are arranged independently of each other. Further, the apparatus comprises an adder 40 for adding the output signal Sga of the analog IF amplifier 3a, the first digital output signal Sgd-1 of the first digital IF amplifier 3d-1 and the second digital output signal Sgd-2 of the second digital IF amplifier 3d-2. The sum Ss produced from the adder 40 is supplied to the demodulator 55.

The analog intermediate frequency signal in the receiving signal Sr (intermediate frequency signal) retrieved from the tuner 1, as in the embodiment shown in FIG. 7, by being passed through the analog IF bandpass filter 2a, can be selectively retrieved as an analog intermediate frequency signal Sfa containing the analog modulated wave existing in the frequency band of about 200 kHz of a specific channel. Further, the analog intermediate frequency signal Sfa retrieved from the analog IF bandpass filter 2a is amplified to a predetermined level by the analog IF amplifier 3a.

The output signal Sga output from the analog IF amplifier 3a, like in the embodiment shown in FIG. 7, is input to the analog IF AGC 4a and fed back to the analog IF amplifier 3a. This analog IF AGC 4 makes it possible to adjust the gain of the analog IF amplifier 3a automatically in accordance with the level of the output signal Sga.

In the audio broadcast receiving apparatus shown in FIG. 8, on the other hand, the second digital intermediate frequency signal contained in the receiving signal Sr retrieved from the tuner 1, by being passed through the first digital IF bandpass filter 2d-1, is selectively retrieved as a first digital intermediate frequency signal Sfd-1 containing the digital modulated wave existing in the lower sideband (narrower than 200 kHz) of the frequency band of a specific channel. Further, the first digital intermediate frequency signal Sfd-1 retrieved from the first digital IF bandpass filter 2d-1 is amplified to a predetermined level by the first digital IF amplifier 3d-1.

The first digital output signal Sgd-1 output from the first digital IF amplifier 3d-1 is input to the first digital IF AGC 4d-1 and fed back to the first digital IF amplifier 3d-1. This first digital IF AGC 4d-1 makes it possible to adjust the gain of the first digital IF amplifier 3d-1 automatically in accordance with the level of the first digital output signal Sgd-1.

Also, in the audio broadcast receiving apparatus shown in FIG. 8, the second digital intermediate frequency signal contained in the receiving signal Sr retrieved from the tuner 1, by being passed through the second digital IF bandpass filter 2d-2, is selectively retrieved as a second digital intermediate frequency signal Sfd-2 containing the digital modulated wave existing in the upper sideband (narrower than 200 kHz) of the frequency band of a specific channel. Further, the second digital intermediate frequency signal Sfd-2 retrieved from the second digital IF bandpass filter 2d-2 is amplified to a predetermined level by the second digital IF amplifier 3d-2.

The second digital output signal Sgd-2 output from the second digital IF amplifier 3d-2 is input to the second digital IF AGC 4d-2, and fed back to the second digital IF amplifier 3d-2. This second digital IF AGC 4d-2 makes it possible to adjust the gain of the second digital IF amplifier 3d-2 automatically in accordance with the level of the second digital output signal Sgd-2.

As described above, in the audio broadcast receiving apparatus shown in FIG. 8, the analog IF bandpass filter 2a, the analog IF amplifier 3a and the analog IF AGC 4a for processing the analog intermediate frequency signal, the first digital IF bandpass filter 2d-1, the first digital IF amplifier 3d-1 and the first digital IF AGC 4a-1 for processing the first digital intermediate frequency signal, and the second digital IF bandpass filter 2d-2, the second digital IF amplifier 3d-2 and the second digital IF AGC 4a-2 for processing the second digital intermediate frequency signal are arranged independently of each other. In this way, the operation of controlling the gain of the analog IF amplifier 3a, the operation of controlling the gain of the first digital IF amplifier 3d-1 and the operation of controlling the gain of the second digital IF amplifier 3d-2 can be performed independently of each other.

The analog IF bandpass filter 2a is required to pass only the analog intermediate frequency selectively, and therefore the bandwidth of the analog IF bandpass filter can be narrower as compared with that of the conventional audio broadcast receiving apparatus. Further, the first digital IF bandpass filter 2d-1 and the second digital bandpass filter 2d-2 are required to selectively pass the digital intermediate frequency signal containing the digital modulated wave in the lower sideband and the digital intermediate frequency signal containing the digital modulated wave in the upper sideband, respectively. Therefore, the bandwidth of the first and second digital IF bandpass filters can be narrowed as compared with the corresponding bandwidth in the embodiment shown in FIG. 7. As a result, the analog modulated wave and the digital modulated wave of an adjacent station are less likely to intrude, as noise, into the frequency band of the channel of the desired station than in the embodiment shown in FIG. 7.

In this way, the audio broadcast receiving apparatus shown in FIG. 8 can more positively suppress the occurrence of the interference and the intermodulation between the desired station and adjacent stations. Thus, the receiving characteristic of the analog audio broadcast and the digital audio broadcast desired by the user is further improved.

As explained with reference to the embodiment shown in FIG. 7, the gain of the first digital IF amplifier 3d-1 and the second digital IF amplifier 3d-2 in the IBOC scheme is required to be set to a value lower than the gain of the analog IF amplifier 4a.

The reference level Vb of the first digital output signal Sgd-1 of the first digital IF amplifier 3d-1 used for controlling the gain of the particular first digital IF amplifier 3d-1 and the reference level Vc of the second digital output signal Sgd-2 of the second digital IF amplifier 3d-2 used for controlling the gain of the particular second digital IF amplifier 3d-2, therefore, are desirably set to a value lower than the reference level Va of the output signal Sga of the analog IF amplifier used for controlling the gain of the particular analog IF amplifier 3a.

Further, in the case in which the digital modulated wave of the digital audio broadcast is not actually transmitted from the desired station but the analog modulated wave of the analog audio broadcast, the power level of the digital modulated wave is zero at the time of transmission. In such a case, the reference level Vb of the first digital output signal Sgd-1 of the first digital IF amplifier 3d-1 and the reference level Vc of the second digital output signal Sgd-2 of the second digital IF amplifier 3d-2 are desirably set to a value much lower than the reference level Va of the output signal Sga of the analog IF amplifier 3a (i.e. a value lower than when the digital modulated wave of the digital audio broadcast is transmitted).

Also, the audio broadcast receiving apparatus shown in FIG. 8 comprises a control unit 9 for controlling a series of operations of each component element of the audio broadcast receiving apparatus 11 based on the various control signals Sco. This control unit 9 is desirably implemented by a CPU (central processing unit).

Based on the control operation of the CPU 9, the analog intermediate frequency signal is selectively passed through the analog IF bandpass filter, and further, the analog intermediate frequency signal that has passed through the analog IF bandpass filter is amplified and input to the demodulator. On the other hand, the first digital intermediate frequency signal containing the digital modulated wave of the lower sideband is passed selectively through the first digital IF bandpass filter, and further, the first digital intermediate frequency signal that has passed through the first digital IF bandpass filter is amplified by the first digital IF amplified and input to the demodulator. Also, the second digital intermediate frequency signal containing the digital modulated wave of the upper sideband is selectively passed through the second digital IF bandpass filter, and further, the second digital intermediate frequency signal that has passed through the second digital IF bandpass filter is amplified by the second digital IF amplifier and input to the demodulator. The operation of controlling the gain of the analog IF amplifier automatically in accordance with the level of the output signal of the analog IF amplifier, the operation of controlling the gain of the first digital IF amplifier automatically in accordance with the level of the first digital output signal of the first digital IF amplifier, and the operation of controlling the gain of the second digital IF amplifier automatically in accordance with the level of the second digital output signal of the second digital IF amplifier are performed independently of each other. In this way, the audio broadcast receiving method according to the second embodiment of the invention is implemented.

In the audio broadcast receiving apparatus shown in FIG. 8, only a small part of the component parts of the audio broadcast receiving apparatus of the IBOC scheme such as the analog IF bandpass filter and the analog IF amplifier for processing the analog intermediate frequency signal, the digital IF bandpass filter and the digital IF amplifier for processing the first digital intermediate frequency signal and the digital IF bandpass filter and the digital IF amplifier for processing the second digital intermediate frequency signal are arranged independently of each other in the particular audio broadcast receiving apparatus of the IBOC scheme. Therefore, the apparatus configuration is simplified as compared with the configuration in which the audio broadcast receiving apparatus for receiving the analog modulated wave and the audio broadcast receiving apparatus for receiving the digital modulated wave are arranged independently of each other.

Figure 9:
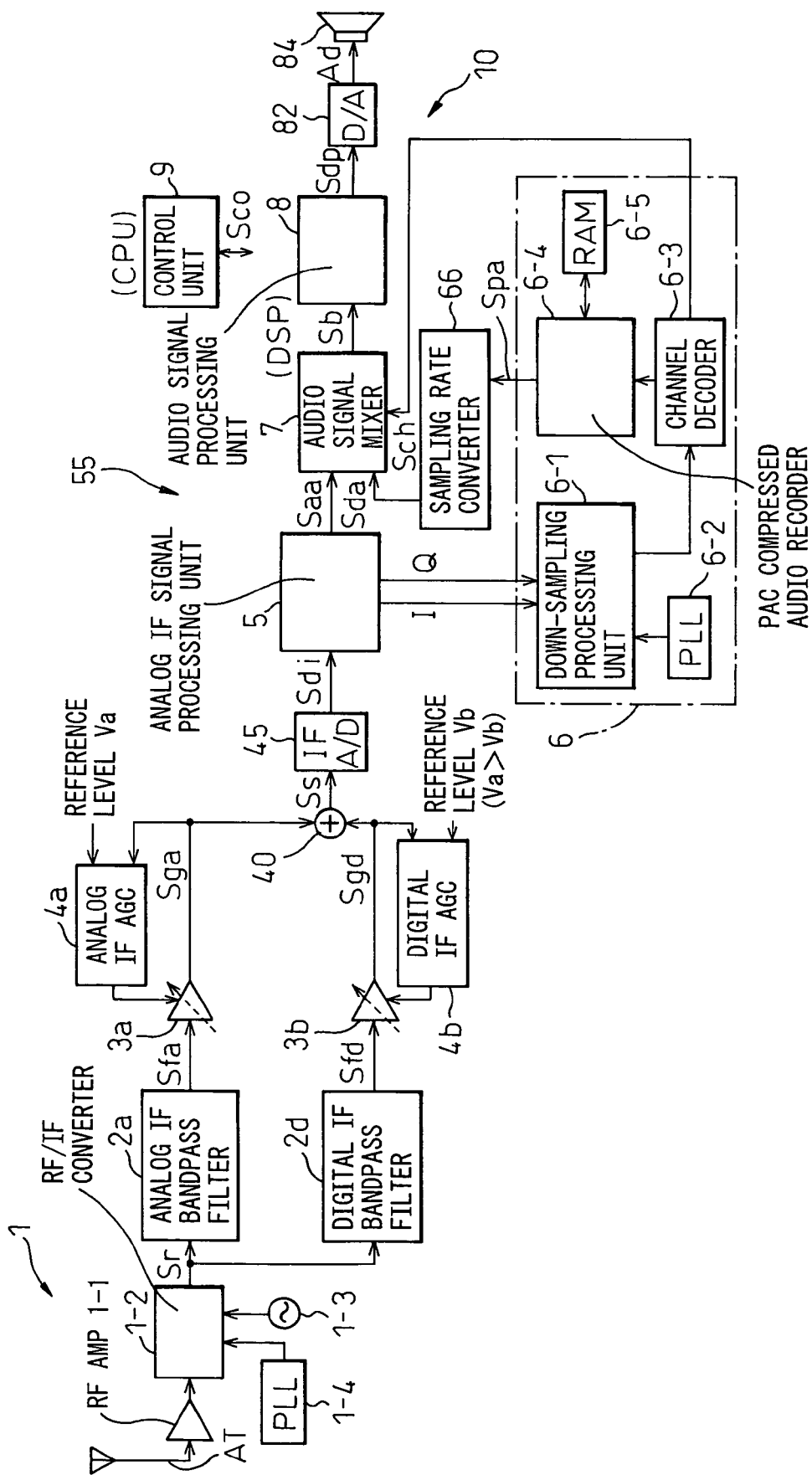
FIG. 9 is a block diagram showing a specific configuration of the embodiment shown in FIG. 7.

FIG. 9 is a block diagram showing a specific configuration of the embodiment shown in FIG. 7. In FIG. 9, the specific configuration of the tuner 1 and the digital IF signal processing unit 6 according to the embodiment of FIG. 7 is shown.

The tuner 1 shown in FIG. 9 includes a radio-frequency amplifier (hereinafter referred to as the RF amplifier) 1-1 for selectively amplifying the analog modulated wave and the digital modulated wave of the radio-frequency signal received through the antenna AT and a radio frequency signal/intermediate frequency signal converter (hereinafter referred to as the RF/IF converter) 1-2 for converting the analog modulated wave and the digital modulated wave retrieved from the RF amplifier 1-1 into an intermediate frequency signal.

The radio-frequency amplifier 1-1 has the function of selecting, by tuning, and amplifying the analog modulated wave and the digital modulated wave in the frequency band of a specific channel from among a plurality of channels of the FM radio broadcast transmitted by IBOC scheme. This channel select operation of the radio-frequency amplifier 1-1 is controlled by the control unit 9 such as a CPU. The analog modulated wave and the digital modulated wave retrieved from the radio-frequency amplifier 1-1 are radio-frequency signals difficult to demodulate by the normal demodulating process, and therefore required to be converted into an intermediate frequency signal of a frequency easy to demodulate (such as an intermediate frequency of 10.7 MHz).

For this reason, the RF/IF converter 1-2 is arranged on the output side of the RF amplifier 1-1. The RF/IF converter 1-2 has the function of mixing the radio-frequency signal retrieved from the RF amplifier 1-1 with the reference signal supplied from the local oscillator 1-3 and generating an intermediate frequency signal of 10.7 MHz. To generate this intermediate frequency signal accurately, a PLL (phase locked loop) circuit 1-4 is activated so that the radio-frequency signal from the RF amplifier 1-1 may be in phase with the reference signal from the local oscillator 1-3.

The audio broadcast receiving apparatus shown in FIG. 9, as explained with reference to the embodiment shown in FIG. 7, comprises an analog IF bandpass filter 2a for selectively passing the analog intermediate frequency signal (receiving signal Sr) containing the analog modulated wave retrieved from the RF/IF converter 1-2 and an analog IF amplifier 3a for amplifying the analog intermediate frequency signal Sfa that has passed through the analog IF bandpass filter 2a.

Further, the audio broadcast receiving apparatus shown in FIG. 9, as explained with reference to the embodiment shown in FIG. 7, comprises a digital IF bandpass filter 2d for selectively passing the digital intermediate frequency signal containing the digital modulated wave retrieved from the tuner 1 and a digital IF amplifier 3d for amplifying the digital intermediate frequency signal Sfd that has passed through the digital IF bandpass filter 2d.

Furthermore, the audio broadcast receiving apparatus shown in FIG. 9, as explained with reference to the embodiment shown in FIG. 7, comprises an adder 40 for adding the output signal Sga of the analog IF amplifier 3a and the output signal Sgd of the digital IF amplifier 3d. The sum Ss produced from the adder 40 is supplied to the demodulator 55.

In addition, the digital IF signal processing unit 6 shown in FIG. 9 includes a down-sampling processing unit 6-1 for down-sampling the digital intermediate frequency signal contained in the signal output from the adder 40, a channel decoder 6-3 for decoding the channel selected by the tuner 1 based on the digital intermediate frequency signal retrieved from the down-sampling processing unit 6-1, a PAC compressed audio decoder 6-4 for retrieving the digital audio signal by decoding the digital intermediate frequency signal containing the audio information compressed by a PAC (perceptual audio coder) scheme, and a RAM (random access memory) 6-5 for temporarily storing the data related to the digital audio signal decoded by the PAC compressed audio decoder 6-4. The channel information decoded by the channel decoder 6-3 is supplied as a channel decode signal Sch to the audio signal mixer 7.

The down-sampling processing unit 6-1, in order to facilitate the demodulation by sampling of the digital intermediate frequency signal contained in the signal output from the adder 40, has the function of reducing the sampling rate to about 1 MHz by down-sampling the digital intermediate frequency signal. In order to execute this down-sampling process accurately, the phase of the digital intermediate frequency signal is synchronized by operating the PLL circuit 6-2.

The component elements other than the tuner 1 and the digital IF signal processing unit 6 have been explained above, with reference to the embodiment shown in FIG. 7, and will not be explained again.

Figure 10:
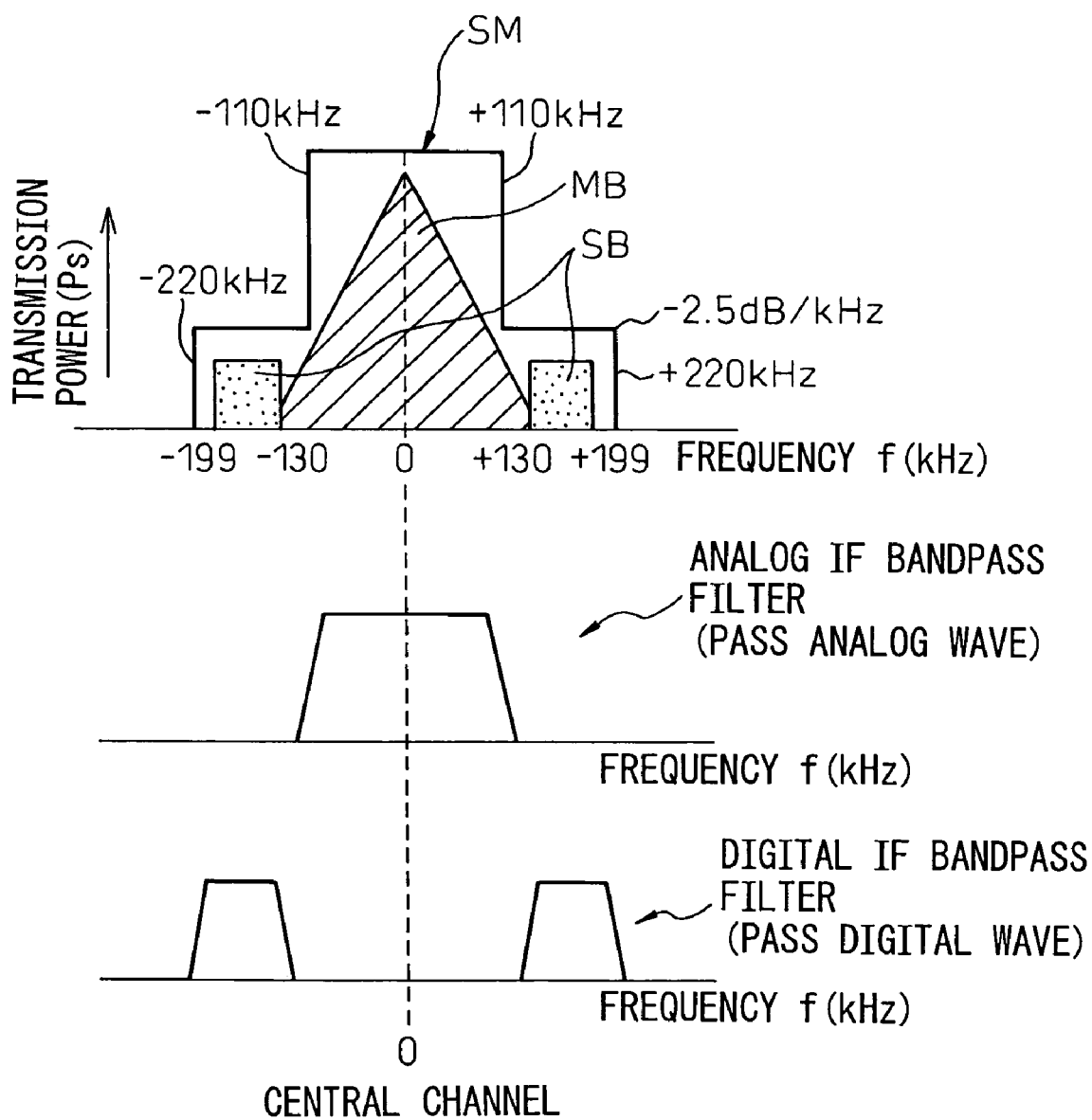
FIG. 10 is a diagram showing the frequency characteristic of the two bandpass filters shown in FIG. 9.

FIG. 10 is a diagram showing the frequency characteristic of the two bandpass filters shown in FIG. 9. In FIG. 10, the frequency characteristic of the analog IF bandpass filter and the digital IF bandpass filter of the audio broadcast receiving apparatus shown in FIG. 9 to receive the FM radio broadcast and the digital audio broadcast of the IBOC scheme is shown.

Figure 1:
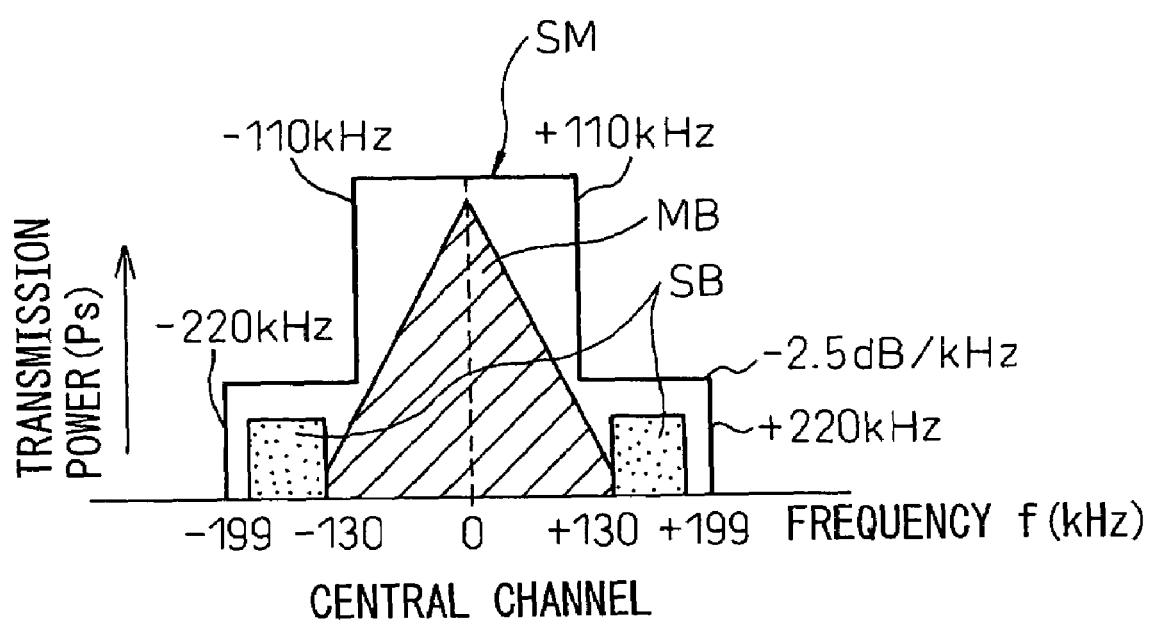
FIG. 1 is a schematic diagram for explaining an outline of the IBOC scheme used for the terrestrial digital broadcast in North America.

Generally, as shown in FIG. 1, the IBOC scheme is so configured that the analog modulated wave of the FM radio broadcast is transmitted in the band (analog wave band) MB at the central portion of one frequency band, while at the same time transmitting the digital modulated wave of the digital audio broadcast in the lower and upper sidebands (sidebands of the digital wave) SB in the particular frequency band.

Further, according to the IBOC scheme, as shown in FIG. 1, the frequency bandwidth of a given channel is set to about 440 kHz (+220 kHz from the central channel). Also, the frequency bandwidth of the analog modulated wave of the FM radio broadcast is set to about 220 kHz (about ±110 kHz from the central channel) in the central band MB based on the spectrum mask SM. The frequency bandwidth of the digital modulated wave of the digital audio broadcast, on the other hand, is set to about 90 kHz for each of upper and lower sidebands SB. The frequency interval between the broadcast station of a given channel and a broadcast station of an adjacent channel is set to 200 kHz.

As shown in FIG. 10, the analog IF bandpass filter selectively retrieves the analog modulated wave existing in the frequency band of about 200 kHz of a specific channel by passing the analog intermediate frequency signal containing the particular analog modulated wave.

The digital IF bandpass filter, on the other hand, selectively retrieves the digital modulated wave existing in the two side bands SB of the frequency band of a specific channel by passing the intermediate frequency signal containing the particular digital modulated wave.

The audio broadcast receiving apparatus shown in FIG. 9 comprises an analog IF bandpass filter for passing the analog intermediate frequency signal and a digital IF bandpass filter for passing the digital intermediate frequency signal. In other words, the analog IF bandpass filter is required to pass only the analog intermediate frequency signal selectively, and the digital IF bandpass filter to pass only the digital intermediate frequency signal selectively. Therefore, the bandwidth of the analog IF bandpass filter and the digital bandpass filter can be narrowed as compared with the corresponding bandwidth in the conventional configuration (FIG. 4). As a result, the analog modulated wave and the digital modulated wave of an adjacent broadcast station have a lesser chance of intruding, as noise, into the frequency band of the channel of the desired station.

The digital intermediate frequency signal may be received due to the interference of an adjacent station. Even in such a case, the analog intermediate frequency signal that has been selectively passed through the analog IF bandpass filter can be received without being affected by the interference from the adjacent station.

Figure 11:
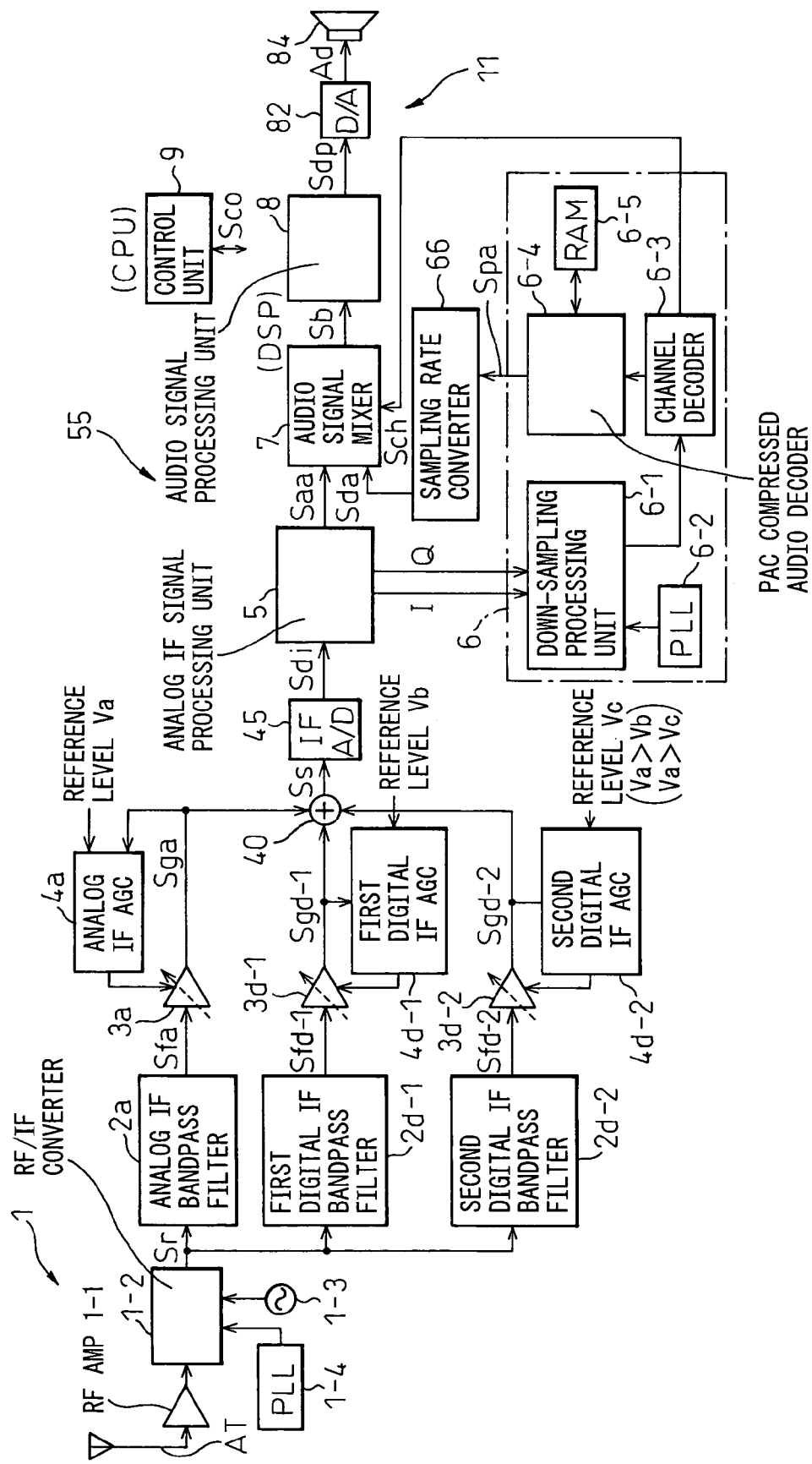
FIG. 11 is a block diagram showing a specific configuration of the embodiment shown in FIG. 8.

FIG. 11 is a block diagram showing a specific configuration of the embodiment shown in FIG. 8. In FIG. 11, a specific configuration of the tuner 1 and the digital IF signal processing unit 6 according to the embodiment of FIG. 8 is shown.

The specific configuration of the tuner 1 and the digital IF signal processing unit 6 shown in FIG. 11, however, is identical with that of the first embodiment shown in FIG. 9, and therefore, will not be explained again.

The audio broadcast receiving apparatus shown in FIG. 11 comprises, as explained with reference to the embodiment shown in FIG. 8, an analog IF bandpass filter 2a for selectively passing the analog intermediate frequency signal (receiving signal Sr) containing the analog modulated wave retrieved from the RF/IF converter 1-2, and an analog IF amplifier 3a for amplifying the analog intermediate frequency signal Sfa that has been passed through the analog IF bandpass filter 2a.

Further, the audio broadcast receiving apparatus shown in FIG. 11, as explained with reference to the embodiment shown in FIG. 8, comprises a first digital IF bandpass filter 2d-1 for selectively passing the first digital intermediate frequency signal containing the digital modulated wave in the lower sideband retrieved from the tuner 1, and a first digital IF amplifier 3d-1 for amplifying the first digital intermediate frequency signal Sfd-1 that has passed through the first digital IF bandpass filter 2d-1.

Furthermore, the audio broadcast receiving apparatus shown in FIG. 11, as explained in the embodiment shown in FIG. 8, comprises an adder 40 for adding the output signal Sga of the analog IF amplifier 3a, the first digital output signal Sgd-1 of the first digital IF amplifier 3d-1 and the second digital output signal Sgd-2 of the second digital IF amplifier 3d-2. The sum Ss produced by the adder 40 is supplied to the demodulator 55.

The component elements of the audio broadcast receiving apparatus shown in FIG. 11 other than the analog IF bandpass filter 2a, the analog IF amplifier 3a, the analog IF AGC 4a, the first digital IF bandpass filter 2d-1, the first digital IF amplifier 3d-1, the first digital IF AGC 4d-1, the second digital IF bandpass filter 2d-2, the second digital IF amplifier 3d-2 and the second digital IF AGC 4d-2 are identical with those of the first embodiment shown in FIG. 9 and, therefore, are not explained in detail.

Figure 12:
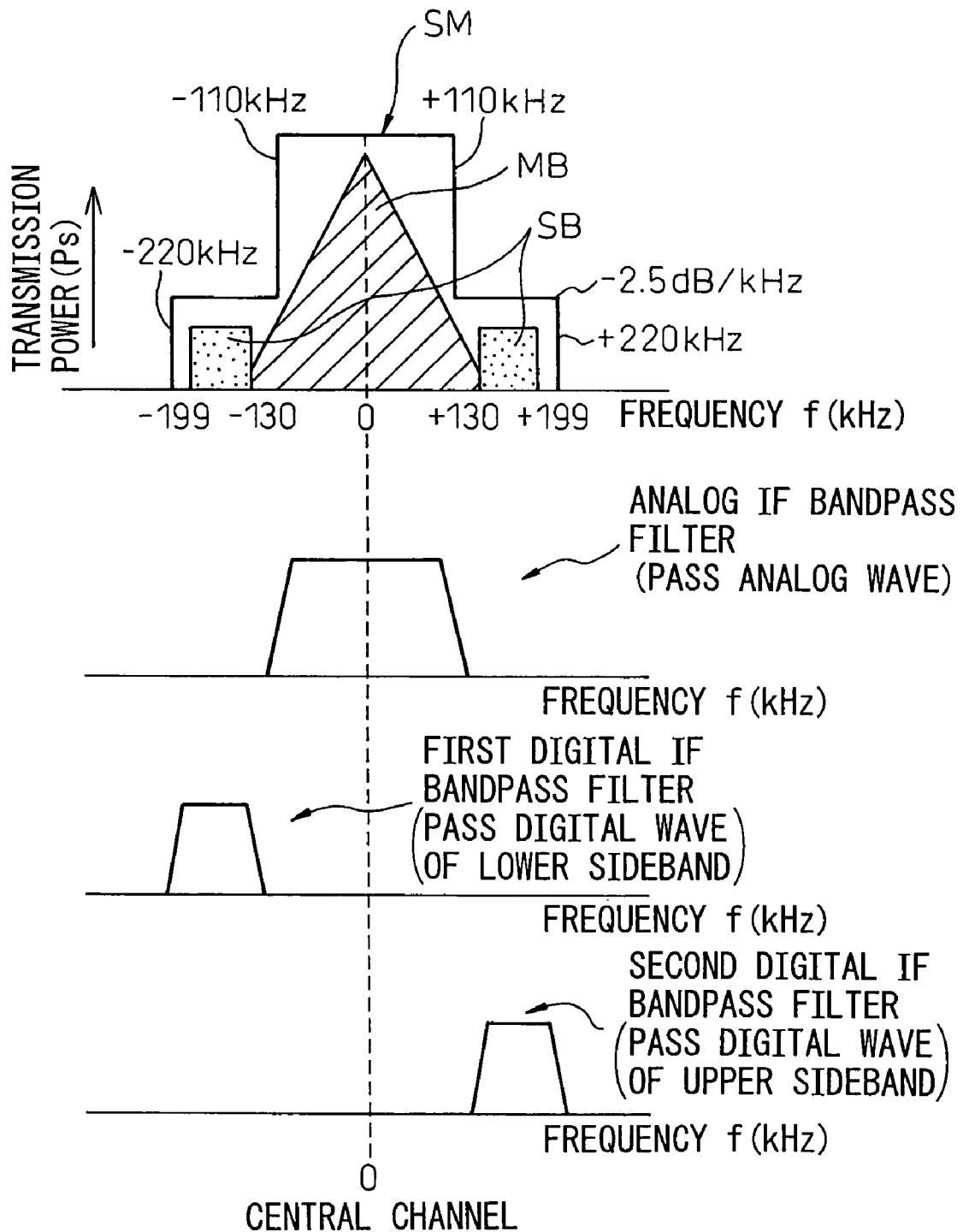
FIG. 12 is a diagram showing the frequency characteristic of the three bandpass filters shown in FIG. 11.

FIG. 12 is a diagram showing the frequency characteristic of the three bandpass filters shown in FIG. 11. FIG. 12, however, shows the frequency characteristic of the analog IF bandpass filter, the first digital IF bandpass filter and the second digital IF bandpass filter for receiving the FM radio broadcast and the digital audio broadcast of IBOC scheme through the audio broadcast receiving apparatus shown in FIG. 11.

Generally, the IBOC scheme is so configured that, as explained with reference to FIGS. 1 and 10, the analog modulated wave of the FM radio broadcast is transmitted in the central band MB in one frequency band while at the same time transmitting the digital modulated wave of the digital audio broadcast in the lower and upper sidebands SB in the same frequency band.

As shown in FIG. 12, the analog IF bandpass filter selectively retrieves the analog modulated wave existing in the frequency band of about 200 kHz of a specific channel by passing the analog intermediate frequency signal containing the particular analog modulated wave.

On the other hand, the first digital IF bandpass filter selectively retrieves the digital modulated wave existing in the lower sideband SB in the frequency band of a specific channel by passing the first digital intermediate frequency signal containing the particular digital modulated wave.

Further, the second digital IF bandpass filter selectively retrieves the digital modulated wave existing in the upper sideband SB in the frequency band of a specific channel by passing the second digital intermediate frequency signal containing the particular digital modulated wave.

The audio broadcast receiving apparatus shown in FIG. 11 comprises, independently of each other, an analog IF bandpass filter for passing the analog intermediate frequency signal, a first digital IF bandpass filter for passing the first digital intermediate frequency signal and a second digital IF bandpass filter for passing the second digital intermediate frequency signal. In other words, the analog IF bandpass filter is required to selectively pass only the analog intermediate frequency signal, and therefore can have a bandwidth narrower than in the prior art (FIG. 4). Further, the first digital IF bandpass filter 2d-1 and the second digital IF bandpass filter 2d-2 are required to selectively pass only the digital intermediate frequency signal containing the digital modulated wave in the lower sideband and the digital intermediate frequency signal containing the digital modulated wave in the upper sideband, respectively. Therefore, the bandwidth of the first and second digital IF bandpass filters can be narrower than in the embodiment of FIG. 10. As a result, the analog modulated wave and the digital modulated wave of an adjacent broadcast station have a smaller chance of intruding, as noise, into the frequency band of the desired broadcast station than in the embodiment shown in FIG. 10.

The interference with the desired broadcast station from an adjacent broadcast station may be either in the lower frequency sideband or the upper frequency sideband. Regardless of which frequency sideband has an interference of higher level in the audio broadcast receiving apparatus shown in FIGS. 11 and 12, however, the digital intermediate frequency signal can be received, if existing in either the upper or lower sideband.

Finally, with regard to the industrial applicability of the invention, the invention is applicable to an audio broadcast receiving apparatus of the IBOC scheme which can simultaneously receive both an analog audio broadcast, such as the FM radio broadcast, and a digital audio broadcast, such as the terrestrial digital broadcast, in a mobile unit.

The invention claimed is:

1. An audio broadcast receiving apparatus comprising:
   a tuner for simultaneously receiving an analog audio broadcast radio wave and a digital broadcast radio wave transmitted in parallel with the analog audio broadcast radio wave in a specific frequency band;
   a demodulator for retrieving the intended audio information by demodulating the receiving signal received by the tuner;
   an analog receiving signal bandpass filter for selectively passing the receiving signal corresponding to the analog audio broadcast radio wave;
   an analog receiving signal amplifier for amplifying the receiving signal passed through the analog receiving signal bandpass filter and outputting an output signal to the demodulator, the analog receiving signal amplifier having the gain thereof controlled in accordance with the level of the output signal;
   a digital receiving signal bandpass filter for selectively passing the receiving signal corresponding to the digital audio broadcast radio wave; and
   a digital receiving signal amplifier for amplifying the receiving signal passed through the digital receiving signal bandpass filter and outputting an output signal to the demodulator, the digital receiving signal amplifier having the gain thereof controlled in accordance with the level of the output signal.

2. An audio broadcast receiving apparatus according to claim 1,
   wherein the reference level of the output signal of the digital receiving signal amplifier used for controlling the gain of the digital receiving signal amplifier is set to a value lower than the reference level of the output signal of the analog receiving signal amplifier used for controlling the gain of the analog receiving signal amplifier.

3. An audio broadcast receiving apparatus according to claim 2,
   wherein the reference level of the output signal of the digital receiving signal amplifier used for controlling the gain thereof when the digital broadcast radio wave is not actually transmitted is set to a value lower than when the digital broadcast radio wave is transmitted.

4. An audio broadcast receiving apparatus according to claim 1, further comprising an adder for adding the output signal of the analog receiving signal amplifier and the output signal of the digital receiving signal amplifier, wherein the sum signal produced from the adder is supplied to the demodulator.

5. An audio broadcast receiving apparatus comprising:
   a tuner for simultaneously receiving the analog audio broadcast radio wave in a specific frequency band and the digital broadcast radio wave transmitted in the lower sideband and the upper sideband in the specific frequency band in parallel with each other;
   a demodulator for retrieving the intended audio information by demodulating the receiving signal received by the tuner;
   an analog receiving signal bandpass filter for selectively passing the receiving signal corresponding to the analog audio broadcast radio wave;
   an analog receiving signal amplifier for amplifying the receiving signal passed through the analog receiving signal bandpass filter and outputting an output signal to the demodulator, the analog receiving signal amplifier having the gain thereof controlled in accordance with the level of the output signal;
   a first digital receiving signal bandpass filter for selectively passing the receiving signal corresponding to the digital audio broadcast radio wave in the lower sideband;
   a first digital receiving signal amplifier for amplifying the receiving signal passed through the first digital receiving signal bandpass filter and outputting an output signal to the demodulator, the first digital receiving signal amplifier having the gain thereof controlled in accordance with the level of the output signal;
   a second digital receiving signal bandpass filter for selectively passing the receiving signal corresponding to the digital audio broadcast radio wave in the upper sideband; and
   a second digital receiving signal amplifier for amplifying the receiving signal passed through the second digital receiving signal bandpass filter and outputting an output signal to the demodulator, the second digital receiving signal amplifier having the gain thereof controlled in accordance with the level of the output signal.

6. An audio broadcast receiving apparatus according to claim 5,
   wherein each of the reference level of the output signal of the first digital receiving signal amplifier used for controlling the gain of the first digital receiving signal amplifier and the reference level of the output signal of the second digital receiving signal amplifier used for controlling the gain of the second digital receiving signal amplifier is set to a value lower than the reference level of the output signal of the analog receiving signal amplifier used for controlling the gain of the analog receiving signal amplifier.

7. An audio broadcast receiving apparatus according to claim 6,
   wherein each of the reference level of the output signal of the first digital receiving signal amplifier used for controlling the gain of the first digital receiving signal amplifier and the reference level of the output signal of the second digital receiving signal amplifier used for controlling the gain of the second digital receiving signal amplifier when the digital broadcast radio wave is not actually transmitted is set to a value lower than when the digital broadcast radio wave is transmitted.

8. An audio broadcast receiving apparatus according to claim 5, further comprising an adder for adding the output signal of the analog receiving signal amplifier, the output signal of the first digital receiving signal amplifier and the output signal of the second digital receiving signal amplifier, wherein the sum of the output signals is applied to the demodulator.

9. An audio broadcast receiving method comprising:
  causing a tuner to simultaneously receive the analog audio broadcast radio wave and the digital broadcast radio wave transmitted in parallel to the analog audio broadcast radio wave in a specific frequency band;
  causing a demodulator to demodulate the signal received by the tuner and retrieve the intended audio information;
  causing an analog receiving signal bandpass filter to selectively pass the receiving signal corresponding to the analog audio broadcast radio wave;
  causing an analog receiving signal amplifier to amplify the receiving signal passed through the analog receiving signal bandpass filter with a gain controlled in accordance with the output signal of the analog receiving signal amplifier and input the amplified signal to the demodulator;
  causing a digital receiving signal bandpass filter to selectively pass the receiving signal corresponding to the digital audio broadcast radio wave; and
  causing a digital receiving signal amplifier to amplify the receiving signal passed through the digital receiving signal bandpass filter with a gain controlled in accordance with the output signal of the digital receiving signal amplifier and input the amplified signal to the demodulator.

10. An audio broadcast receiving method comprising:
  causing a tuner to simultaneously receive an analog audio broadcast radio wave in a specific frequency band and a digital broadcast radio wave in the lower sideband and the upper sideband transmitted in parallel with each other in the specific frequency band;
  causing a demodulator to demodulate the receiving signal received by the tuner thereby to retrieve the intended audio information;
  causing an analog receiving signal bandpass filter to selectively pass the receiving signal corresponding to the analog audio broadcast radio wave;
  causing an analog receiving signal amplifier to amplify the receiving signal passed through the analog receiving signal bandpass filter with a gain controlled in accordance with the output signal of the analog receiving signal amplifier and input the amplified signal to the demodulator;
  causing a first digital receiving signal bandpass filter to selectively pass the receiving signal corresponding to the digital audio broadcast radio wave in the lower sideband;
  causing a first digital receiving signal amplifier to amplify the receiving signal passed through the first digital receiving signal bandpass filter with a gain controlled in accordance with the output signal of the first digital receiving signal amplifier and input the amplified signal to the demodulator;
  causing a second digital receiving signal bandpass filter to selectively pass the receiving signal corresponding to the digital audio broadcast radio wave in the upper sideband; and
  causing a second digital receiving signal amplifier to amplify the receiving signal passed through the second digital receiving signal bandpass filter with a gain controlled in accordance with the output signal of the second digital receiving signal amplifier and input the amplified signal to the demodulator.

* * * * *